United States Patent
Hong et al.

(10) Patent No.: US 7,820,590 B2
(45) Date of Patent: Oct. 26, 2010

(54) METHOD FOR PREPARING VANADIUM/TITANIA-BASED CATALYST FOR REMOVING NITROGEN OXIDE AT LOW TEMPERATURE

(75) Inventors: Sung-Ho Hong, Seoul (KR); Seok-Joo Hong, Seoul (KR); Sung-Chang Hong, Seoul (KR); Tae-Sung Park, Seoul (KR); Jun-Yub Lee, Anyang-si (KR); Sung-Pill Cho, Siheung-si (KR)

(73) Assignee: Korea Power Engineering Company, Inc., Gyeonggi-do (KR)

( * ) Notice: Subject to any disclaimer, the term of this patent is extended or adjusted under 35 U.S.C. 154(b) by 0 days.

(21) Appl. No.: 12/154,693

(22) Filed: May 23, 2008

(65) Prior Publication Data
US 2008/0234126 A1 Sep. 25, 2008

Related U.S. Application Data

(63) Continuation-in-part of application No. 10/732,082, filed on Dec. 9, 2003, now abandoned.

(30) Foreign Application Priority Data
Sep. 27, 2003 (KR) ....................... 10-2003-0067200

(51) Int. Cl.
*B01J 23/00* (2006.01)
(52) U.S. Cl. ...................................... 502/353; 502/350
(58) Field of Classification Search ................. 502/350, 502/353
See application file for complete search history.

(56) References Cited

U.S. PATENT DOCUMENTS

| | | | | |
|---|---|---|---|---|
| 3,926,852 A | * | 12/1975 | Cahen et al. | 502/209 |
| 4,152,296 A | | 5/1979 | Okabe et al. | |
| 4,182,745 A | | 1/1980 | Nishida et al. | |
| 4,228,038 A | * | 10/1980 | Konig | 502/350 |
| 4,448,897 A | * | 5/1984 | Gastinger | 502/350 |
| 4,448,898 A | * | 5/1984 | Sun | 502/350 |
| 4,582,912 A | * | 4/1986 | Saleh et al. | 549/239 |
| 4,835,126 A | * | 5/1989 | Wachs et al. | 502/209 |
| 4,916,107 A | | 4/1990 | Brand et al. | |
| 4,929,586 A | | 5/1990 | Hegedus et al. | |
| 4,952,548 A | | 8/1990 | Kato et al. | |

(Continued)

FOREIGN PATENT DOCUMENTS

JP 1990-086845 3/1990

OTHER PUBLICATIONS

Briand et al.; Temperature-programmed reduction of $V_2O_5$ and coprecipitated $V_2O_5$-$TiO_2$ by hydrogen; *J. Thermal Analysis* 44(1995) 803-821E.

*Primary Examiner*—Cam N Nguyen
(74) *Attorney, Agent, or Firm*—Abelman, Frayne & Schwab

(57) ABSTRACT

Disclosed is a method of preparing a vanadium/titania-based catalyst containing non-stoichiometric vanadium and titanium having excellent ability to remove nitrogen oxides at a wide temperature window, particularly, at a relatively low temperature window of 300° C. or lower.

7 Claims, 7 Drawing Sheets

U.S. PATENT DOCUMENTS 5,753,582 A    5/1998  Garcin et al.
5,792,722 A *  8/1998  Haddad et al. .............. 502/211
6,054,408 A    4/2000  Hums et al.

* cited by examiner

METHOD FOR PREPARING VANADIUM/TITANIA-BASED CATALYST FOR REMOVING NITROGEN OXIDE AT LOW TEMPERATURE

CROSS-REFERENCE TO RELATED APPLICATIONS

This application is a Continuation-In-Part of application Ser. No. 10/732,082, filed 9 Dec. 2003, and now abandoned.

TECHNICAL FIELD

The present invention relates to a method of preparing a vanadium/titania-based catalyst for removing nitrogen oxides at a relatively low temperature window. More specifically, the present invention relates to a method of preparing a vanadium/titania-based catalyst containing non-stoichiometric vanadium and titanium having excellent ability to remove nitrogen oxides at a wide temperature window, particularly, at a relatively low temperature window of 300° C. or lower.

BACKGROUND ART

Generally, nitrogen oxides are generated from a stationary source such as an industrial boiler, a gas turbine, a steam power plant, a waste incinerator, a marine engine, and a petrochemical plant. A technology of removing nitrogen oxides may be classified into the following three methods. Firstly, a fuel denitrification method includes treating a fossil fuel to remove nitrogen compounds contained therein. A second method includes improving a combustion condition. At this time, the improvement of the combustion condition may be accomplished through an excess air feeding and a multi-stage combustion process in consideration of the type of a fuel. Finally, a post-treating method includes treating an exhausted gas to remove nitrogen oxides.

In the fuel denitrification method, even though the fossil fuel is treated at relatively high temperatures under hydrogen for a long time in order to remove nitrogen oxides contained in a coal, only about 16% of total nitrogen oxides content is removed. Additionally, in the case of the second method to improve the combustion condition, it is impossible to remove nitrogen oxides in efficiency of 30-40% or more because an exhaustion condition of nitrogen oxides is inversely related to a thermal efficiency.

Among the three methods, the post-treatment is sufficiently competitive in terms of removing efficiency of nitrogen oxides, thus being commercialized.

The post-treatment is roughly classified into wet and dry treating methods. In this regard, the wet treating method has advantages in that nitrogen oxides and sulfur oxides are simultaneously removed, and thus is applied to a process in which a small amount of nitrogen oxides is emitted. However, it is required to oxidize NO into $NO_2$ because a solubility of NO in water is poor, thus not securing economic efficiency. In addition, undesirably, $NO_3$ and $N_2O_4$ generated as a side product during oxidizing NO into $NO_2$ should be re-treated.

Accordingly, the dry treating method is being watched with keen interest. The dry treating method is classified into a selective non-catalytic reduction (SNCR) process in which nitrogen oxides are selectively reduced into nitrogen and moisture by spraying ammonia into nitrogen oxides at a relatively high temperature ranging from about 850 to 1050° C. without using a catalyst, and a selective catalytic reduction (SCR) process in which nitrogen oxides are reduced into nitrogen and moisture at a relatively low temperature of about 150 to 450° C. using a catalyst. The SNCR process has an advantage in that 50% or more of nitrogen oxides are removed at relatively low costs, but has disadvantages in that unreacted ammonia forms ammonium salts, thus plugging or corroding a device positioned after a reactor. Further, a narrow operation temperature range is still problematic. Therefore, the selective catalytic reduction is being considered as a useful approach for removing nitrogen oxides generated from a stationary source in views of economic and technological efficiency.

In the SCR process, nitrogen oxides such as nitrogen monoxide (NO) and nitrogen dioxide ($NO_2$) are reduced into nitrogen and moisture using ammonia as a reducing agent in the presence of the catalyst, as shown in the following Reaction equations 1 to 4. At this time, an exhausted gas contains oxygen as well as nitrogen oxides, thus, practically, the reduction of nitrogen oxides is accomplished according to the Reaction equations 3 and 4.

| | |
|---|---|
| $6NO+4NH_3 \rightarrow 5N_2+6H_2O$ | Reaction equation 1 |
| $6NO_2+8NH_3 \rightarrow 7N_2+12H_2O$ | Reaction equation 2 |
| $4NO+4NH_3+O_2 \rightarrow 4N_2+6H_2$ | Reaction equation 3 |
| $2NO_2+4NH_3+O_2 \rightarrow 3N_2+6H_2O$ | Reaction equation 4 |

However, undesirably, ammonia used as the reducing agent reacts with oxygen, thus producing nitrogen and nitrogen oxides, as shown in the following Reaction equations 5 to 8.

| | |
|---|---|
| $4NH_3+3O_2 \rightarrow 2N_2+6H_2O$ | Reaction equation 5 |
| $4NH_3+4O_2 \rightarrow 2N_2O+6H_2O$ | Reaction equation 6 |
| $4NH_3+5O_2 \rightarrow 4NO+6H_2O$ | Reaction equation 7 |
| $4NH_3+7O_2 \rightarrow 4NO_2+6H_2O$ | Reaction equation 8 |

Usually, the oxidation of ammonia is accelerated with an increase of a temperature, and competes with the reduction of nitrogen oxides. Hence, a conversion of nitrogen oxides depends on the temperature. In the case of the exhausted gas without moisture, the oxidation of ammonia according to the Reaction equation 6 does rarely occur, but nitrogen oxides are generated according to the Reaction equations 7 and 8. At this time, a reaction rate of ammonia with oxygen is increased with an increase in the temperature.

Meanwhile, in case that the exhausted gas contains moisture and sulfur oxides, the moisture and sulfur oxides form salts, thus reducing the activity of the catalyst. The catalyst is poisoned by the moisture and/or the sulfur oxides as set forth in the following Reaction equations 9 to 12.

| | |
|---|---|
| $2NH_3+H_2O+2NO_2 \rightarrow NH_4NO_3+NH_4NO_2$ | Reaction equation 9 |
| $2SO_2+O_2 \rightarrow 2SO_3$ | Reaction equation 10 |
| $NH_3+SO_3+H_2O \rightarrow NH_4HSO_4$ | Reaction equation 11 |
| $SO_3+H_2O \rightarrow H_2SO_4$ | Reaction equation 12 |

In the Reaction equation 9, nitrogen dioxide reacts with ammonia to produce ammonium nitrate. The as-synthesized ammonium nitrate is known to be decomposed at 150° C. or higher. Thus, the catalyst is not poisoned by ammonium nitrate at 150° C. or higher. Practically, ammonia is fed into the exhausted gas at 150° C. or higher, and the catalyst is poisoned by sulfates formed according to the Reaction equation 11, which remain on the catalyst without being decomposed. At this time, such sulfates are produced from sulfur trioxide generated according to the Reaction equation 10.

Furthermore, sulfuric acid is produced according to the Reaction equation 12, causing corrosion of a catalyst bed and other devices in a subsequent stage to be corroded.

The production of sulfur trioxide according to the Reaction equation 10 is increased at relatively high temperatures. Thus, there remains a need to develop a catalyst capable of selectively reducing nitrogen oxides at a relatively low temperature window in order to suppress the production of sulfates and sulfuric acid according to the Reaction equations 11 and 12.

Various catalysts from precious metal catalysts to basic metal catalysts have been proposed in the SCR technology. Furthermore, it is reported that supports for the metal catalyst play an important role in the SCR. In this regard, most of the recently developed SCR catalysts include vanadium as an active material, and for example, the desirable SCR performance is obtained by use of a catalyst in which vanadium pentoxide ($V_2O_5$) is supported on titania ($TiO_2$), alumina ($Al_2O_3$) or silica ($SiO_2$). At this time, the most important one of criteria of the support is the resistance to sulfur. In fact, titania is mainly used as support in commercialized vanadium-contained catalysts. In addition, a catalyst including tungsten or molybdenum is also being developed to suppress sulfur trioxide produced according to the Reaction equation 10.

In order to better understand the background of the invention, a description will be given of conventional technologies for the catalyst containing vanadium as active material.

U.S. Pat. No. 4,152,296 discloses a method of producing a denitrification catalyst comprising impregnating vanadium sulfate ($VSO_4$), vanadyl sulfate ($VOSO_4$), or a mixture thereof onto $TiO_2$ carrier in such a way that at least 0.1%, preferably 0.35 to 1.35% of vanadium element is contained in the catalyst based on a weight of the carrier, and then reacting a mixed gas consisting of ammonia and an inert gas with the impregnated carrier at 300-520° C. The resultant denitrification catalyst has a pore volume of 0.3 to 0.45 cc/g and a specific surface area of 20 to 50 $m^2$/g. Since the mixed gas of ammonia and inert gas is used at the time of calicinating the catalyst in this patent document, but the calcination of a catalyst is conducted in an oxygen atmosphere in the present invention, this patent document is different from the present invention in calcination conditions.

U.S. Pat. No. 4,182,745 discloses a denitrification catalyst having activity at 250 to 450° C., which is produced by impregnating a salt of a transition metal such as Cu, Ti, V, Cr, Mn, Fe, Co, and Ni with a heteropoly acid such as silicotungstic acid, silicomolybdic acid, phosphotungstic acid, and phosphomolybdic acid on a heat-resistant porous material such as alumina, silica, and silica-alumina acting as a carrier, and drying and calcinating the resulting mixture. In this regard, the carrier preferably has a specific surface area of 50 $m^2$/g or more and a pore volume of 0.2 to 1.5 cc/g.

Further, U.S. Pat. No. 4,929,586 discloses a catalyst for removing $NO_x$, in which an active material such as $V_2O_5$, $MoO_3$, $WO_3$, $Fe_2O_3$, $CuSO_4$, $VOSO_4$, $SnO_2$, $Mn_2O_3$, and $Mn_3O_4$ is supported on a titania carrier ($TiO_2$) with an anatase crystalline structure. At this time, a conversion of $NO_x$ is about 90% at 350° C. The titania carrier has a micropore porosity of 0.05 to 0.5 cc/cc, a macropore porosity of 0.05 to 0.5 cc/cc, and a total porosity of 0.8 cc/cc or lower. In this regard, the micropore porosity means a porosity of pores with a pore size of 600 Å or less, and the macropore porosity means a porosity of pores with a pore size of 600 Å or more.

Furthermore, U.S. Pat. No. 5,045,516 discloses a method of producing a catalyst for removing nitrogen oxides, in which molybdenum trioxide and 10% or less vanadium pentoxide are supported on $TiO_2$. In this regard, $TiO_2$ includes 500 ppm or less calcium, 100 ppm or less iron, and 60% or more anatase crystal, and has a mean particle size of 10 to 100 nm, a mean pore radius of 10 to 30 nm, and a BET surface area of 10 to 80 $m^2$/g to prevent the catalyst from being poisoned by arsenic compounds contained in an exhausted gas.

U.S. Pat. No. 5,753,582 discloses a catalyst comprising a carrier, such as alumina, aluminate, titanium dioxide, or zirconium dioxide, and active metals, such as vanadium oxides, molybdenum oxides, or tungsten oxides, which can be applied at a temperature of 300° C. or higher, and preferably at a high temperature of 350~450° C.

Moreover, U.S. Pat. No. 6,054,408 discloses a catalyst for removing nitrogen oxides, in which 0.01 to 5 wt % molybdenum trioxide and 0.01 to 5 wt % vanadium pentoxide are supported on an anatase-typed titania ($TiO_2$) carrier. The anatase-typed titania carrier includes 5% or less rutile-typed crystalline structure, 500 ppm or less sodium, 500 ppm or less potassium, 500 ppm or less iron, and 0.5% or less phosphorus.

U.S. Pat. No. 4,952,548 discloses a catalyst for removing nitrogen oxides, the atomic ratio of Ti:Mo and/or W:V being 80-96.5:3-15:0.5-5. Particularly, a size of a $TiO_2$ crystal is limited to prevent a $TiO_2$ surface of the catalyst from being poisoned by heavy metals, and thus has a range of 185 to 300 Å in the direction of plane (101) according to a Sherrer equation.

Furthermore, U.S. Pat. No. 4,916,107 discloses a catalyst for removing nitrogen oxides, which includes titanium oxides, tungsten oxides, and oxides of at least one metal selected from the group consisting of vanadium, iron, niobium, and molybdenum. In detail, an anatase-typed titania ($TiO_2$) is used as a carrier, the catalyst has a specific surface area of 50±15 $m^2$/g, a first mean particle size of 30 nm, a dry loss of 1.5 wt %, and an ignition loss of 2 wt %. In addition, the catalyst comprises 99.5% $TiO_2$, 0.3 wt % $Al_2O_3$, 0.2 wt % $SiO_2$, 0.01 wt % $Fe_2O_3$, and 0.3 wt % HCl.

The above patents specify physical properties of titania used as the carrier, but do not mention how the properties and states of an active metal oxides supported on the carrier and the reaction participation of lattice oxygen due to the properties and states of the active metal oxides affect the SCR performance, and most of the above patents mention catalysts which can be applied at a high temperature of 300° C. or higher, as in U.S. Pat. No. 5,753,582. Additionally, most of the above patents disclose that vanadium used as the active metal is vanadium pentoxide.

As described above, commercialized denitrification catalysts include tungsten or molybdenum to improve activity and poison resistance to sulfur dioxide of a conventional $V_2O_5$/$TiO_2$-based catalyst. Most of denitrification catalysts have optimum activity at a relatively high temperature of 300~400° C. Therefore, an equipment for removing nitrogen oxides in a thermoelectric power plant or a general boiler is installed in a region where the temperature of flue gas is 300~400° C. In a thermoelectric power plant, the equipment for removing nitrogen oxides may be provided at the rear end of an economizer in order to secure the temperature of flue gas. In this case, flue gas can be maintained at high temperature, but dust in the flue gas is directly transferred to the denitrification catalyst, thus causing a catalyst to be worn or be plugged. For this reason, when a honeycomb catalyst is mounted, cell size is increased, so that contact area is decreased, thereby increasing the amount of catalyst. Such a system is referred to as a high-dust system. In order to decrease the influence of dust, an electrostatic dust collector or a bag filter may be provided at the front end of a denitrification equipment, but most dust collection systems are operated in normal only when the temperature of flue gas is low. Occasionally, a high-temperature electrostatic dust collector is used, but cost is very high. Such a system is referred to as a low-dust system. This low-dust system is influenced by dust, but is disadvantageous in that the temperature of flue gas is high, and it takes much cost to maintain the temperature of flue gas at high temperature. Moreover, when sulfur oxides are present in flue gas, ammonium sulfate can be formed due to the low flue gas temperature. The ammonium sulfate poisons a catalyst and corrodes the denitrification equipment, thus shortening the life span of the total system. In order to solve the disadvantages, a desulfurization equipment may be provided at the front end of the denitrification equipment. Such a system is referred to as a tail-end system. This tail-end system can remove sulfur oxides and dust from the flue gas flowing into the denitrification equipment. However, in the desulfurization equipment, a wet type desulfurization method or a semi-dry type desulfurization method is used, and the temperature of flue gas is decreased to 100° C. or lower. It is almost impossible to conduct denitrification at these low temperatures. Therefore, the temperature of flue gas must be raised to a temperature at which the denitrification reaction can be conducted using a flue gas reheating apparatus, such as a duct-burner, etc. In practical, it is required to consume a great amount of power corresponding to about five to ten % of a total capacity of a power plant to raise the temperature of the flue gas by approximately 100° C. Even in the low-dust system, flue gas is reheated after the dust collector, and, at this time, auxiliary fuel must be supplied. As described above, a conventional flue gas denitrifying process is a process of removing nitrogen oxides from flue gas using high energy depending on the catalytic activity at high temperature. Therefore, when the conventional equipments are utilized in the denitrifying process, a $V_2O_5/TiO_2$-based catalyst must be installed in the space of a temperature of about 300~400° C. at which the $V_2O_5/TiO_2$-based catalyst is activated. In this case, there are systematic problems and spatial problems depending on installation positions. Furthermore, the denitrifying process at relatively high temperatures is disadvantageous in that it increases the thermal fatigue of a catalytic bed, thus reducing a life span of the catalyst, and promotes the oxidation of sulfur dioxide, thus producing a catalyst poison such as ammonium sulfate.

Hence, unlike the conventional $V_2O_5/TiO_2$-based catalyst, a catalyst capable of maintaining high catalytic activity at a low temperature of 300° C. or lower is required to reduce auxiliary fuel cost in the low-dust system or tail-end system and to establish an equipment for removing nitrogen oxides, which does not need a flue gas reheating apparatus even if the catalyst is installed at a temperature lower than 300-400° C. Thus, the catalyst is advantageous in that economic efficiency can be improved, denitrification systems can be variously designed and installed, and the problem of a life span of the catalyst due to thermal fatigue can be overcome by suppressing the production of the catalyst poison caused by sulfur oxides and maintaining high catalytic activity even at low temperatures.

Regardless of this requirement, the conventional commercial $V_2O_5/TiO_2$-based catalyst is activated at a relatively high temperature of 300° C. or higher, but its activity is drastically reduced at a relatively low temperature of 300° C. or lower, so that desired nitrogen oxides removal efficiency is accomplished by installing a flue gas reheating apparatus or increasing the amount of a catalyst. Because an activation energy necessary for a selective catalytic reduction reaction is insufficient at a low temperature range of 300° C. or lower, it is difficult to cause the oxidation/reduction of the catalyst. Accordingly, a conversion of nitrogen oxides is low at 220° C. or lower, and an exhaustion concentration of unreacted ammonia is high. Nitrogen oxides and unreacted ammonia in the flue gas are poisonous to human body, and unreacted ammonia reacts with sulfur compounds and moisture in the flue gas to form ammonium salts, thus deactivating the catalyst. Therefore, it is necessary to develop a catalyst with excellent oxidizing and reducing ability at even relatively low temperature window.

DISCLOSURE OF THE INVENTION

Accordingly, the present invention has been made keeping in mind the above problems occurring in the prior arts, and an aspect of the present invention is to provide a method of preparing a vanadium/titania-based catalyst with high activity at low temperatures as well as at high temperatures. The catalyst contains a titania support useful to produce a catalyst with high activity at a relatively low temperature of 300° C. or lower.

Generally, a denitrification catalyst has optimum activity at a high temperature of 300° C. or higher. The reason for this is that, when a nitrogen oxides removal reaction (selective catalytic reduction reaction), which is one of oxidation and reduction reactions, is conducted, thermal energy having a temperature of 300° C. or higher is required as activation energy. However, the efficiency for removing nitrogen oxides included in low-temperature flue gas of 300° C. or lower is relatively low, and, in order to solve this problem, expensive equipments must be installed or the amount of a catalyst must be increased. However, this problem can also be solved using a catalyst having high activity at a low temperature of 300° C. or lower. In order to conduct oxidation and reduction reactions at a low temperature of 300° C. or lower, it is preferred that a catalyst be formed of metastable compounds rather than stable compounds. Such metastable compounds are non-stoichiometric chemical species in the preparation method of the present invention. Accordingly, the present invention provides a method of preparing a catalyst formed of non-stoichiometric chemical species, and this method includes a method of selecting materials for forming the non-stoichiometric chemical species.

More specifically, according to an aspect of the present invention, there is provided a vanadium/titania-based catalyst for selectively removing nitrogen oxides from a flue gas through a selective catalytic reduction technique, the vanadium being in a form of oxide and supported on a titania support at an amount of 0.1-10 wt % based on the catalyst, wherein, a generalized value for $V^{4+}$ and $V^{3+}$ is 34 atoms/$cm^3 \cdot$wt % or more, and a generalized value for $Ti^{3+}$ and $Ti^{2+}$ is 415 atoms/$cm^3 \cdot$wt % or more, the generalized value is defined as a number of non-stoichiometric atoms per unit volume ($cm^3$) of the catalyst divided by wt % of the supported vanadium, wherein the titania support has a molar ratio of oxygen (O) to titanium (Ti) of 1.47~2, and the consumption rate of hydrogen to 1 g of the titania support is 1,384 μmol/g or more.

BRIEF DESCRIPTION OF THE DRAWINGS

The above and other aspects, features and other advantages of the present invention will be more clearly understood from the following detailed description taken in conjunction with the accompanying drawings, in which.

BEST MODE FOR CARRYING OUT THE INVENTION

Figure 1:
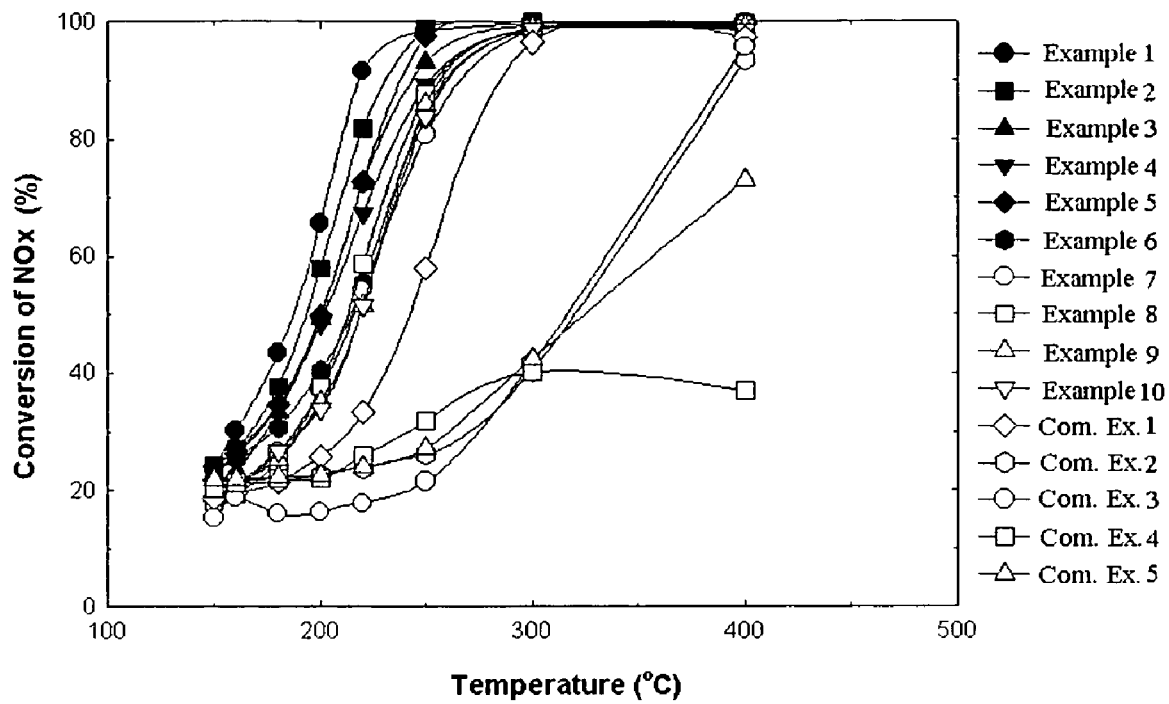
FIG. 1 is a graph showing a conversion of nitrogen oxides as a function of a reaction temperature for catalysts according to Examples and Comparative Examples.

The present invention provides a method of preparing a vanadium/titania-based catalyst having a high nitrogen oxide-removal activity at a low temperature of 300° C. or lower as well as at high temperature in the SCR (selective catalytic reduction) process. The present invention also contributes to finding factors affecting the activity of the vanadium/titania-based catalyst by surface properties of the vanadium/titania-based catalyst, and discloses physical properties of a titania support affecting the surface properties of the vanadium/titania-based catalyst. Furthermore, the present invention describes the grounds of denitrification of the catalyst on the removal, the oxidation/reduction, and the re-oxidation of nitrogen oxides according to the SCR process.

The method and principle of preparing a denitrification catalyst having a high nitrogen oxide-removal activity even at a low temperature of 300° C. or lower are as follows. The denitrification catalyst is prepared by suitably mixing a vanadium precursor with a titania support and then drying and calcining the mixture thereof. In particular, in the calcination process, vanadium has a higher oxygen affinity than titanium in the titania support, and thus lattice oxygen of titania is provided to a vanadium atom. Oxygen contained in the titania support is classified into adsorbed oxygen and lattice oxygen. In this respect, the adsorbed oxygen does not contribute to the SCR upon supporting vanadium onto the titania. Examples of lattice oxygen include oxygen combined with titanium, oxygen in $H_2O$, oxygen combined with hydrogen to form a hydroxyl group, and oxygen combined with carbon. Among them, oxygen combined with titanium is mostly used to produce vanadium oxide. Accordingly, a ratio of oxygen combined with titanium in the titania is very important. For this reason, in the calcination process, as titania is reduced, vanadium holds oxygen generated by the reduction of the titania in common with titanium to form vanadium oxide. At this time, the offer degree of oxygen of titania to vanadium (that is, the reduction degree of titania) affects the formation of vanadium oxide. That is to say, the reduction of titania affects the valence or formation amount of vanadium oxides on a surface of the catalyst. The valence distribution affects removing efficiency of nitrogen oxide in the SCR reaction. Particularly, in the case that nitrogen oxide is selectively reduced at relatively low temperatures in the presence of the vanadium/titania-based catalyst, the participation of lattice oxygen into the reduction of nitrogen oxide and the re-oxidation of gaseous oxygen into lattice oxygen are closely related to electrons generated due to the valence change of vanadium. Thus, the reduction properties and the re-oxidation properties of the catalyst depend on the degree of the transfer of electrons.

That is, because vanadium has +5 valence as a stable oxidation valence, vanadium is oxidized into $V_2O_5$. However, vanadium may be oxidized into $V^{+3}$ due to the deficiency of oxygen, but $V^{+3}$-containing vanadium oxide is known to have much lower activation energy than $V^{+5}$-containing vanadium oxide ($V_2O_5$). Non-stoichiometric $V^{+4}$ or $V^{+3}$ may be represented by $V^{+x}(x \leq 4)$. $V^{+x}(x \leq 4)$ is unstable and has very high activity, compared to $V^{+5}$, which is stoichiometrically stabilized. Since $V^{+x}(x \leq 4)$ is reduced compared to $V^{+5}$, $V^{+4}$ has one excess electron, and $V^{+3}$ has two excess electrons. Since these excess electrons are not bound in an atom, they can act as free electrons and have very high activity. Since these free electrons are present at delocalized orbitals and have very high reactivity, they have low activation energy, and thus they can easily move. That is, since d-orbital, which is the outermost orbital, of vanadium oxides is partially filled with electrons, the electromagnetic, magnetic and catalytic characteristics of vanadium oxides can be changed according to the state of d-orbital. In conclusion, non-stoichiometric vanadium can drive electrons in a catalyst due to the low activation energy thereof. When the surface of a catalyst is formed of unstable compounds, these unstable compounds act as electron donors or electron acceptors on the surface thereof, and are thus reacted by low activation energy. Accordingly, it can be seen that a catalyst including this metastable $V^{+x}(x \leq 4)$ has high catalytic activity. That is, because non-stoichiometric vanadium oxide is produced in the catalyst, the transfer of the electrons becomes more active, and thus the reduction and/or re-oxidation properties of the catalyst are improved to desirably remove nitrogen monoxide through the SCR reaction. Hence, it is preferred to allow the catalyst to contain as many non-stoichiometric vanadium oxides as possible to increase effective electrons and a driving force of electrons.

As non-stoichiometric vanadium is formed, non-stoichiometric titanium is also formed in titania. That is, the titania, which is not impregnated with vanadium, has a stable titanium oxidation valence of +4. However, since a catalyst includes both vanadium and lattice oxygen, titanium is also partially oxidized into non-stoichiometric titanium, such as $Ti^{+3}$, $Ti^{+2}$, etc. In order to form these non-stoichiometric vanadium and titanium, lattice oxygen of a titania support must be provided to vanadium in a calcination process. The lattice oxygen offer ability of titania is influenced by physical properties of titania, such as specific surface area, particle sized, and the like, but is most greatly influenced by the ratio of lattice oxygen in titania. That is, when lattice oxygen is not sufficient, the lattice oxygen transferred to vanadium is deficient, so that the oxygen for connecting titanium and vanadium is also deficient, with the result that non-stoichiometric vanadium and titanium are also deficient. When a calcination process is conducted under an oxygen atmosphere, vanadium is directly reacted with oxygen and thus formed into vanadium oxides, and, at this time, the vanadium may be formed into pure $V_2O_5$ not having high activity because the vanadium is not connected with titanium. Further, when an amorphous titania precursor is used as a carrier, lattice oxygen is also insufficient, because amorphous titania has sufficient oxygen, but the oxygen included therein is not oxygen for forming crystal. Therefore, if vanadium is added in the calcination process, oxygen freely moves to vanadium, and thus vanadium is formed into stable vanadium oxides. Hence, the vanadium does not become non-stoichiometric vanadium. Conversely, when titania has very high crystallinity, lattice oxygen is very sufficient, but cannot be easily provided to vanadium because the crystal of the titania is excessively solid. In this case, since vanadium accepts only gaseous oxygen, rather than lattice oxygen, titania and vanadium oxides are not connected with each other, and exist as individual oxides. Even in this case, non-stoichiometric vanadium and titanium cannot be formed. Accordingly, titania must include a great amount of lattice oxygen which can be provided to vanadium, and must be crystallized at a suitable level. These characteristics in titania can be deduced by the calculation of a molar ratio of oxygen (O) to titanium (Ti) in titania and the reduction property of titania. Based on these findings, the present invention provides a method of preparing a denitrification catalyst for removing nitrogen oxides even at a low temperature of 300° C. or lower, and a method of selecting titania used to prepare the denitrification catalyst.

Hereinafter, a detailed description will be given of the representative preparation of the catalyst according to the present invention.

A vanadium precursor is dissolved in an aqueous solution. At this time, it is preferred that an organic acid is added to the aqueous solution in conjunction with the vanadium precursor to increase solubility of the vanadium precursor. Titania, to be used as a support, is then added to the aqueous solution containing the vanadium precursor and organic acid to produce slurry.

The slurry thus produced is heated to about 50-70° C. while it is agitated to evaporate water from the slurry. In this regard, a vacuum evaporator is preferably used to evaporate water from the slurry. The resulting slurry is then dried at about 80-120° C., preferably about 100° C. for 5-30 hours, and is calcined at about 350-450° C. under an oxygen atmosphere for about 1-10 hours to produce the catalyst of the present invention.

Non-limiting, illustrative examples of the vanadium precursor useful in the present invention are ammonium metavanadate ($NH_4VO_3$) or vanadium oxytrichloride ($VOCl_3$).

Titania and a vanadium precursor exist as a mixture until titania is mixed with a vanadium precursor solution and is then dried. However, the mixture is formed into a catalyst through a calcination process. The calcination process is conducted under an oxygen atmosphere. In the calcination process, when vanadium is formed into vanadium oxides, lattice oxygen is provided to vanadium from a titania support, and vacant sites from which lattice oxygen is detached are filled with gaseous oxygen, but all vacant sites are not filled with gaseous oxygen. However, as the partial pressure of oxygen is increased at the time of calcination, the performance of a denitrification catalyst is increased. Based on this fact, it is proved that gaseous oxygen contributes to form non-stoichiometric chemical species. Accordingly, when catalysts are prepared while changing a calcination atmosphere, such as a nitrogen atmosphere, an oxygen atmosphere which is formed by adjusting the fraction of inert gas, or the like, it is deduced that it is preferred that they be prepared under an oxygen atmosphere.

As previously discussed, a species and a surface distribution ratio of the supported vanadium oxide depend on the reduction of titania used as a support, thereby determining a removal efficiency of nitrogen oxide at the relatively low temperature window.

Although other physical properties of titania such as a specific surface area, a pore volume, and a mean pore size are not critical factors affecting the SCR, it is preferable that the titania has the specific surface area of about 30-350 $m^2/g$, the pore volume of about 0.1-0.8 cc/g, and the mean pore size of about 30-400 Å.

In accordance with the present invention, the most critical factor affecting the SCR performance is the reduction ability of titania. That is to say, when the lattice oxygen of titania is sufficiently provided to vanadium, the desirable SCR performance may be accomplished.

$H_2$-TPR (temperature programmed reduction) test is useful in evaluating the reduction property of titania. According to the present invention, the $H_2$-TPR test is carried out in the following exemplified procedure. 50 mg of titania support particles having a mean diameter of 150 μm or less are heated from room temperature to 900° C. at a heating rate of 10° C./min while 5 volume % hydrogen is fed into a tube at a flow rate of 30 cc/min, and an amount of hydrogen consumed is measured. At this time, titania is pre-treated at 250° C. for 30 min under a nitrogen atmosphere to remove moisture from a surface thereof.

Figure 7:
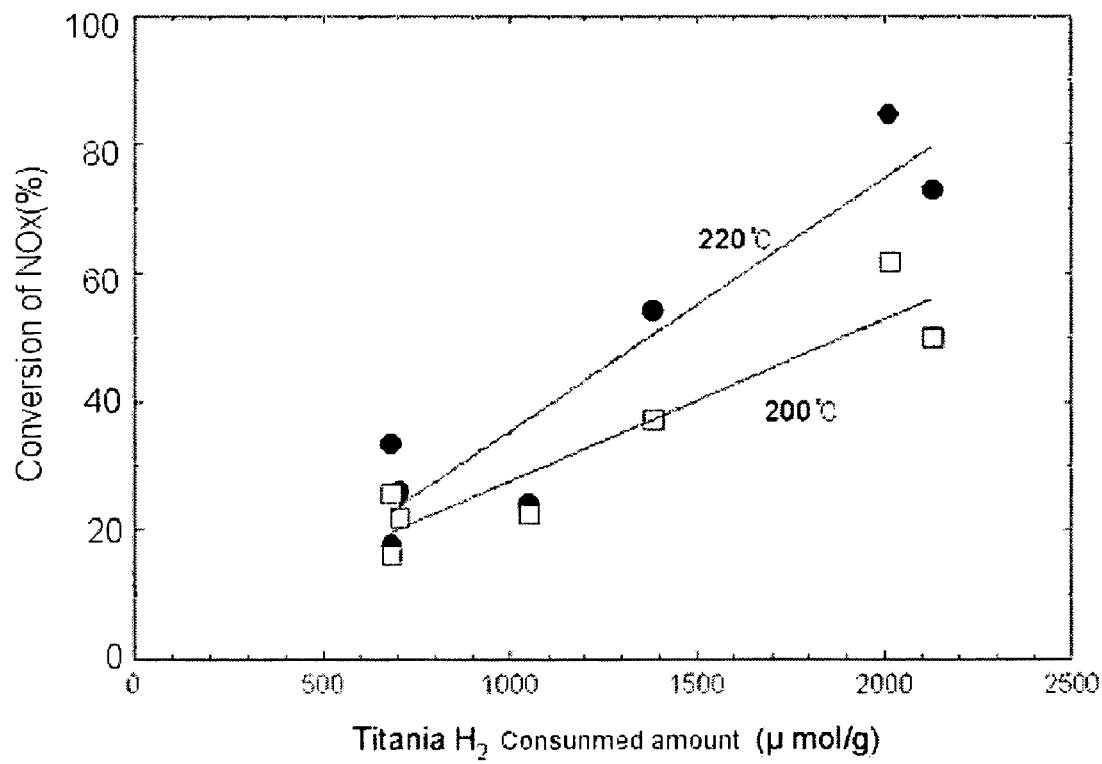
FIG. 7 is a graph showing a conversion of nitrogen oxides at a temperature of 200 and 220° C. as a function of an amount of hydrogen consumed in titania using $H_2$-TPR test.

According to the present invention, it is preferred that an amount of hydrogen consumed per unit weight of titania is about 1.384 μmol/g or more. The results thereof are shown in FIG. 7. At this time, the amount of the consumed hydrogen may be measured by various experiments, and some representative experiments are described in the following Preparation Examples and Comparative Preparation Examples.

Figure 8:
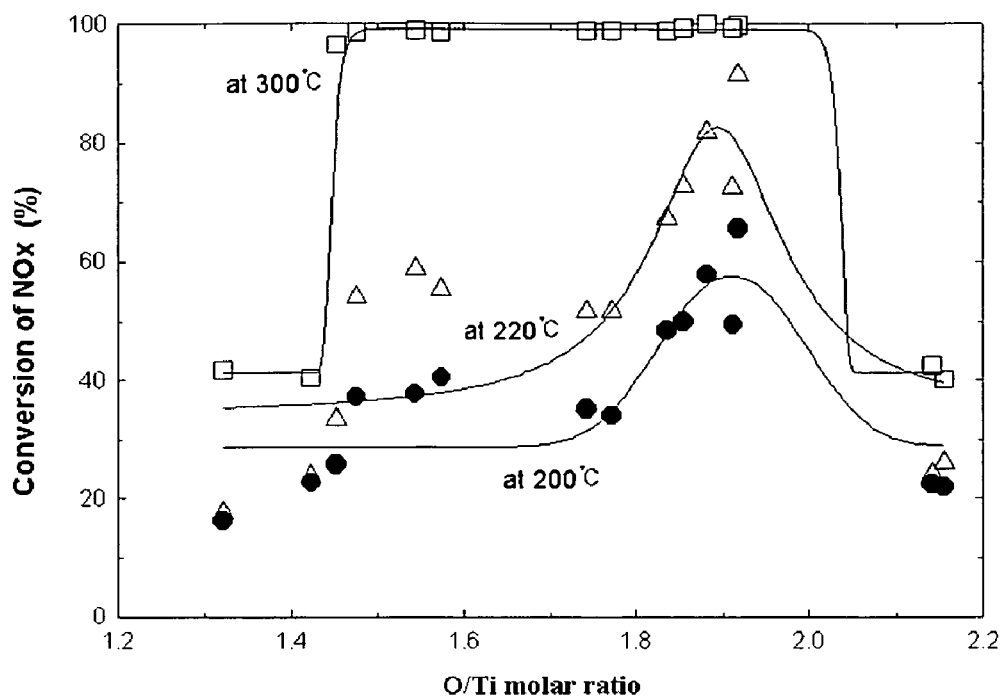
FIG. 8 is a graph showing a conversion of nitrogen oxides at a temperature of 200, 220, and 300° C. as a function of an O/Ti molar ratio of each titania without vanadium-loading according to Preparation Examples 1 to 10 and Comparative Preparation Examples 1 to 5.

Furthermore, it is preferable that a molar ratio (O/Ti) of oxygen to titanium in titania without vanadium-loading is within a range of about 1.47-2.0. This is also verified by various experiments, and results of some representative Examples are illustrated in FIG. 8. From FIG. 8, it can be seen that a catalyst employing titania with the molar ratio of 1.47-2.0 as the support has relatively high denitrification efficiency at low temperatures.

When the O/Ti ratio is 1.47-2.0, an activity of the catalyst is increased. Particularly, as the O/Ti ratio approaches 2.0, an oxygen content in titania is increased, thus increasing an amount of oxygen consumed in the reduction of nitrogen oxide and the activity of the catalyst. Accordingly, an amount of hydrogen consumed in the reduction of nitrogen oxide may be increased, and vanadium oxide with high activity may be formed because oxygen of titania is readily provided while the vanadium precursor is calcined.

Therefore, the activity of the catalyst is maximum when the O/Ti ratio is about 2, and is increased as a chemical formula of titania approaches stoichiometric $TiO_2$. However, when the O/Ti ratio is more than 2, electrons excited by an external energy are transferred into excessively oxidized oxygen, and are consumed in the catalyst in which vanadium is supported on titania, thus the exchange of electrons with reactants is not performed actively. Hence, when the O/Ti ratio is more than 2, titania is insufficiently reduced, and oxygen is not readily provided while the vanadium precursor is calcined. Further, the lattice oxygen of such titania may be increased because titania is sintered at relatively high temperatures during its production. At this time, the specific surface area of titania is reduced because titania is sintered at relatively high temperatures, thus reducing the contact between titania and vanadium to undesirably reduce the formation of vanadium oxide. Furthermore, generally, the O/Ti ratio of titania is increased with the increase in calcination temperature or calcination time of a titania support, and the crystallinity of titania is increased as the calcination temperature and calcination time are continuously increased. That is, as the crystallinity of titania is increased, the structure thereof becomes solid. When the crystallinity of titania is above a predetermined level, oxygen cannot be smoothly transferred to vanadium at the time of calcination. Accordingly, when the O/Ti ratio of titania is excessively high, non-stoichiometric vanadium and titanium may not be formed.

Meanwhile, the catalyst of the present invention is analyzed using an X-ray photoelectron spectroscope (XPS). Particularly, the XPS is useful in examining a chemical state of an active component of the catalyst while the catalyst is produced. Hereinafter, a detailed exemplified description will be given of the detection of $V^{5+}$, non-stoichiometric vanadium atoms, and non-stoichiometric titanium atoms using the XPS, by providing lattice oxygen into vanadium, below.

After the catalyst produced according to the above procedure is dried at about 100° C. for about 24 hours to completely remove moisture contained therein, the species of oxides formed on a surface of the catalyst and a ratio among them may be confirmed by use of the XPS (for example, ESCALAB 201 manufactured by VG Scientific Co.). In this regard, Aluminum X-ray monochlomatic (Al Kα monochlomatic; 1486.6 eV) is used as an excitation source, and an XPS analysis is conducted without a sputtering and an etching process so as to maintain a vacuum pressure at about 10-12 mmHg. Vanadium, titanium, oxygen, and carbon elements on the surface of the catalyst are then analyzed with a wide scanning spectrum to measure the binding energy and intensity. Different characteristic peaks of each element shown in the spectra are separated from each other based on intrinsic binding energies of oxides containing the corresponding element to analyze the species and distribution ratio of oxides on the surface. The characteristic peaks are separated from each other according to a Lorentzian-Gaussian method.

Figure 6:
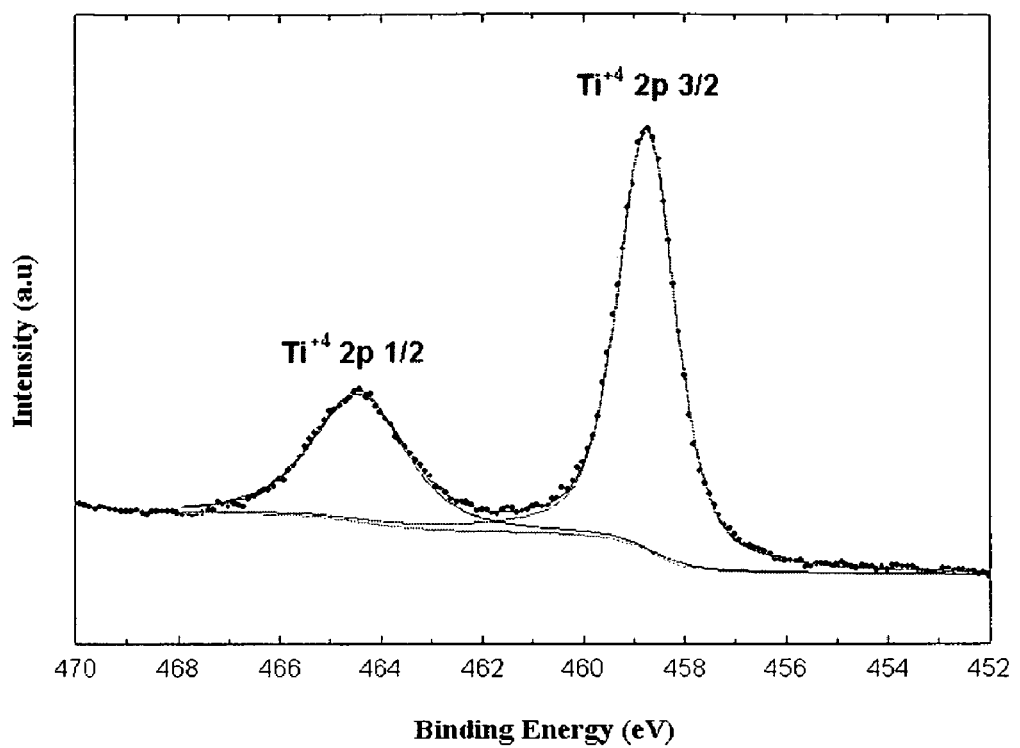
FIG. 6 is a graph showing an XPS analysis result of Ti 2p of a titania support without vanadium-loading according to Comparative Example 1.

From FIG. 6, it can be seen that the binding energy of $Ti^{4+}$ is 458.8 eV at Ti $2p_{3/2}$ and 464.5 eV at Ti $2p_{1/2}$. Further, the binding energy of $Ti^{3+}$ which results from the reduction of $Ti^{4+}$ is 457.9 eV at Ti $2p_{3/2}$ and 463.6 eV at Ti $2p_{1/2}$, and the binding energy of $Ti^{2+}$ is 456.3 eV at Ti $2p_{3/2}$ and 462 eV at Ti $2p_{1/2}$.

As for oxygen combined with titanium, it is analyzed with O 1s. Generally, oxygen in titania exists in a form of oxygen combined with titanium (O—Ti), oxygen contained in moisture or hydroxyl groups physically adsorbed in the catalyst (—OH), and oxygen combined with carbon (C—O). Their binding energies are 529.9 eV, 530.2 eV, and 531.6 eV, respectively. In addition, Ti 2p and O 1s of titania are analyzed to determine a molar ratio of oxygen to titanium, and the molar ratio of oxygen to titanium is intimately associated with removing efficiency of nitrogen oxide, as previously discussed. This is confirmed by Preparation Examples of the present invention, and the results are illustrated in FIG. 8.

According to the present invention, a species and a distribution ratio of vanadium oxides are properties directly indicating the ease of movement of the electrons between reactants and vanadium as the active component on the catalyst. In this regard, through an XPS analysis, as shown in FIG. 3B, it can be seen that the binding energy of $V^{5+}$ is 517.2 eV at V $2p_{3/2}$, $V^{4+}$ is 516.1 eV at V $2p_{3/2}$, and $V^{3+}$ is 515.1 eV at V $2p_{3/2}$.

Figure 4A:
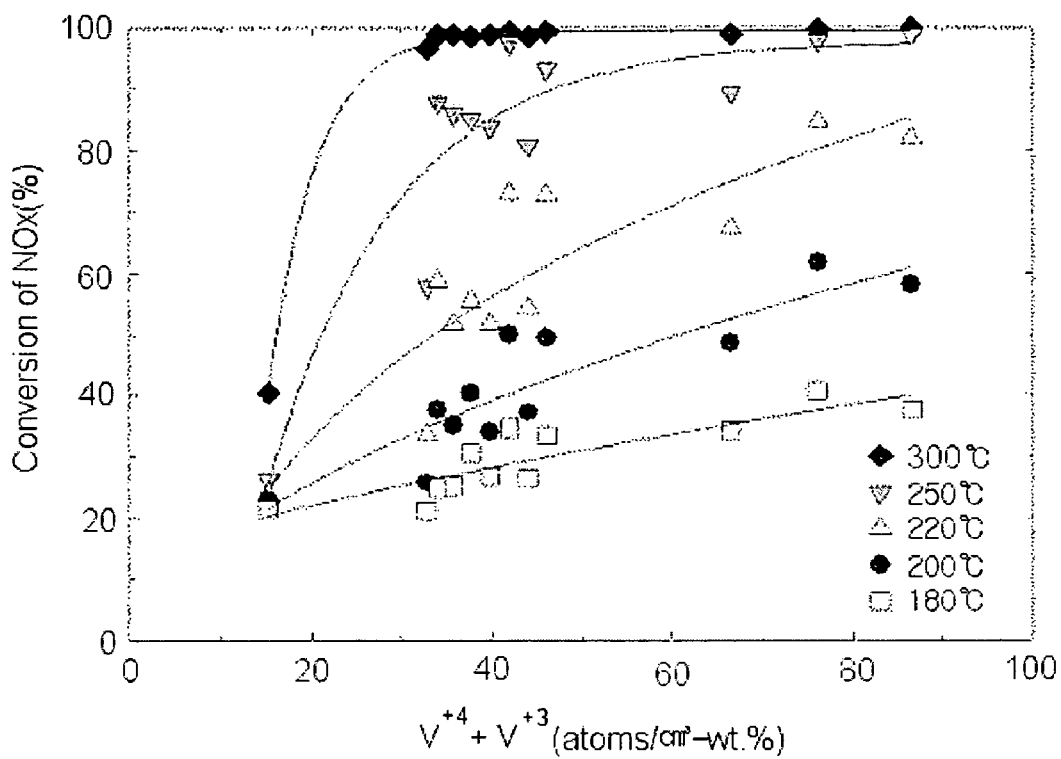
FIG. 4A is a graph showing a conversion of nitrogen oxides at a temperature of 180~300° C. as a function of a generalized value which is obtained by dividing the number of 4+ and 3+ valences of vanadium atoms per unit volume by wt % of the supported vanadium for catalysts according to Examples 1 to 10 of the present invention and Comparative Examples 1 to 3.

An area (the number of photoelectrons obtained per unit hour) is calculated from the XPS analysis in consideration of an atomic sensitivity factor to calculate the number of non-stoichiometric vanadium atoms or titanium atoms per unit volume ($cm^3$) of the catalyst. However, it should be noted that such a number varies with an amount of vanadium loaded on the titania support. The amount of vanadium supported on titania is preferably 0.1-10 wt %, and more preferably 1-5 wt % based on the weight of the catalyst. In consideration of the above, the number of atoms/$cm^3$ is divided by wt % of the supported vanadium to obtain a generalized value. Such a generalized value is expressed in a unit of "atoms/$cm^3$·wt %", hereinafter. In accordance with the present invention, the generalized values for the non-stoichiometric vanadium atoms of $V^{4+}$ and $V^{3+}$ should be about 34 atoms/$cm^3$·wt % or more, and the generalized values for the non-stoichiometric titanium atoms of $Ti^{3+}$ and $Ti^{2+}$ should be about 415 atoms/$cm^3$·wt % or more. Various examples, including Examples and Comparative Examples of the present invention, are shown in FIG. 4A.

In the light of the foregoing, nitrogen oxide is efficiently removed in the presence of non-stoichiometric vanadium atoms at the relatively low temperatures because the vanadium oxides in which vanadium is non-stoichiometrically combined with oxygen (e.g., vanadium trioxide) are partially reduced and thus contain free electrons, unlike $V_2O_5$ with a valence of 5+. For instance, vanadium tetraoxide contains one mole of electron while vanadium trioxide contains two moles of electron, thus the transfer of the electrons may be driven with low activation energy. In fact, the electrons will be readily transferred to participate in the oxidation and reduction reaction at high temperatures. Thus, in order to properly evaluate the SCR performance of the catalyst, a careful consideration should be made as to whether electrons may readily be transferred at low temperatures. At this time, the transfer of electrons closely depends on the free electrons allowing the participation of the electrons in the oxidation and/or reduction. The free electrons may exist in $VO_x$ such as $V_2O_3$ which is reduced from $V_2O_5$. Accordingly, contrary to the conventional catalyst, the activity of the catalyst is improved by various valences of vanadium oxide on the titania support and the distribution thereof.

Titania with excellent reduction ability easily transfers the lattice oxygen therein into vanadium having excellent oxygen affinity when the vanadium is supported on titania, thereby the titania support is reduced while the vanadium is oxidized. Hence, the vanadium receives the lattice oxygen from the titania to bond titanium to vanadium through an oxygen bridge. At this time, the disproportion stemming from different valences between vanadium and titanium leads to the reduction of metal oxides to the non-stoichiometric ones such as $V^{x+}$ and $Ti^{y+}$ (x#4 and y#3). That is to say, since the lattice oxygen is combined with titanium with the valence of 4+ in titania, vanadium will take a form of $V^{4+}$ while titania is reduced after vanadium is impregnated onto the titania support. Two $V^{4+}$ may be combined with each other to form stable $V^{5+}$. Practically, some $V^{4+}$ are combined with each other to form $V^{5+}$ and $V^{3+}$. As a result, the as-prepared catalyst comes to include $V^{4+}$ therein. As described above, the catalyst according to the present invention includes non-stoichiometric metal oxides, and has excellent removing efficiency of nitrogen oxide at relatively low temperatures.

In the case of deviating from the scope of the present invention, a titania support is not sufficiently reduced and it is difficult to form $V^{4+}$ and $V^{3+}$, as shown in Examples according to the present invention. For example, according to Comparative Examples, the O/Ti ratio of titania is from 1.3 to 1.4, thus titania is not desirably reduced because of insufficient lattice oxygen.

On the other hand, the O/Ti ratio of titania according to Comparative Preparation Examples 4 and 5 is about 2.15, but the activity of the catalyst is low even though an oxygen content in titania is high. The reason therefor is that titania is not combined with vanadium at the interface therebetween due to a low reduction ability of the titania, and rather combined with gaseous oxygen to form vanadium oxide while vanadium is impregnated onto titania and calcined. The vanadium oxide thus formed is different from that formed by the reduction of the titania and bonded to titania through the oxygen bridge. Thus, the non-stoichiometric vanadium oxides such as $V_2O_3$ and $V_2O_4$ may be formed on the titania support, which is out of the scope of the present invention, however, such non-stoichiometric vanadium oxides correspond to the simple combination of the vanadium oxide precursor (e.g., ammonium metavanadate) with gaseous oxygen supplied during the calcination.

In view of the above, it is required to employ a titania support, the O/Ti molar ratio of which is within the range of about 1.47-2.0, to secure an improved nitrogen oxide-removal efficiency in the SCR.

Figure 5A:
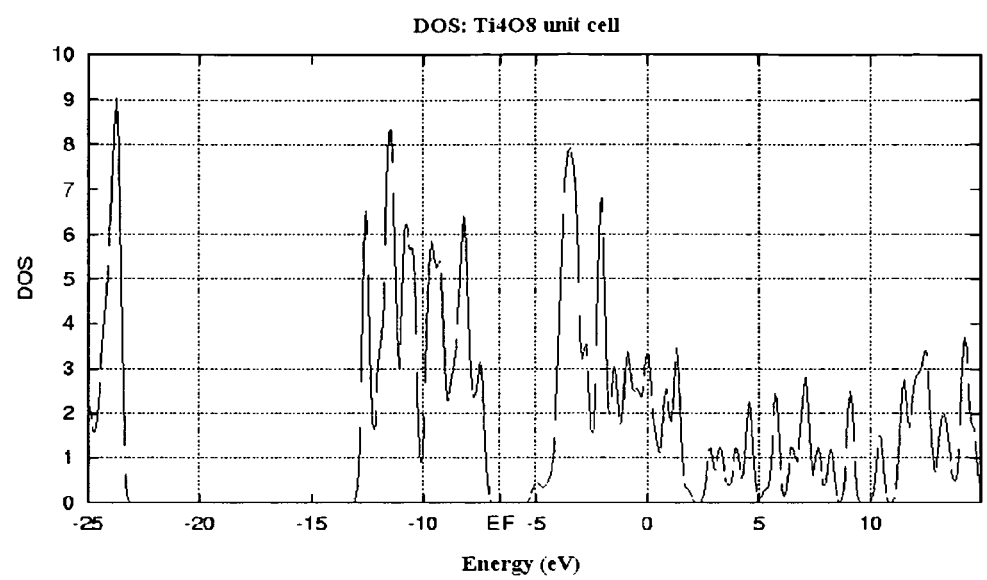
FIG. 5A illustrates a computer simulation result showing a density of state (DOS) as a function of an energy level for anatase-type stoichiometric titania.
Figure 5B:
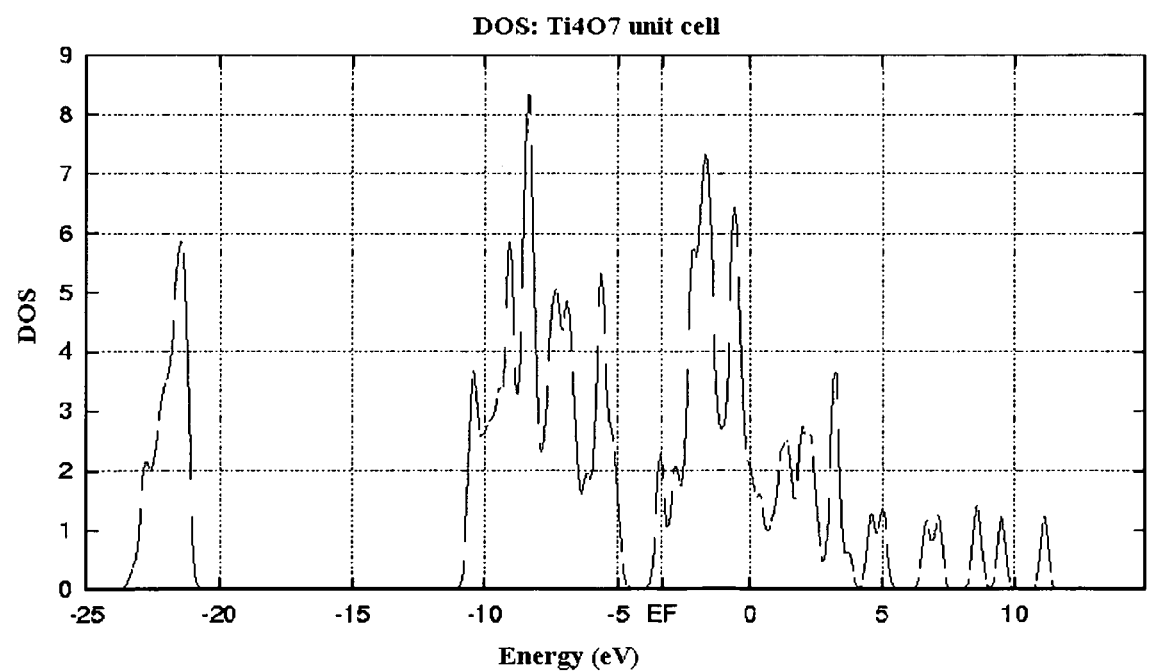
FIG. 5B illustrates a computer simulation result showing a density of state (DOS) as a function of an energy level for a $Ti_4O_7$ compound which is formed by removing one oxygen atom from $Ti_4O_8$ via reduction.

Meanwhile, in the present invention, it is useful to carry out a computer simulation to investigate semiconductor properties of titania without vanadium and of titania in which vanadium is impregnated, that is, stoichiometric $Ti_4O_8$ ($TiO_2$) and non-stoichiometric $Ti_4O_7$. A density of state (DOS) of electrons according to an energy level is obtained by the computer simulation. Then, a relative valence band (hereinafter, referred to as "VB") to oxides, an energy level of conduction band (hereinafter, referred to as "CB") and a band-gap energy are calculated using the DOS. The results are illustrated in FIGS. 5A and 5B. An electron transfer by an external energy from a Fermi level and an energy level of the CB explains how non-stoichiometric vanadium oxide improves efficiency of the SCR. This will be described in detail in Example 3.

In addition, according to the present invention, a temperature programmed surface reaction (TPSR) is conducted to evaluate an oxidizing and a reduction ability of the catalyst. In detail, $H_2$-TPR (temperature programmed reduction) test is carried out to evaluate the reduction ability of the catalyst, while $O_2$-TPO (temperature programmed oxidation) test is carried out to evaluate the oxidizing ability of the catalyst. Further, an oxygen-reoxidation test is carried out to evaluate a re-oxidation rate of the catalyst, and will be described in more detail in Examples.

In the $H_2$-TPR test of the catalyst containing vanadium, 50 mg of catalyst is pre-treated at 400° C. for 30 min while air flows through the catalyst at a rate of 30 cc/min, left at 300° C. for 90 min or more while nitrogen flows through the catalyst at a rate of 30 cc/min to remove oxygen adsorbed in the catalyst, cooled to room temperature, and heated at a heating rate of 10° C./min to 900° C. while 5 volume % hydrogen flows through the catalyst at a rate of 30 cc/min. As a result, a discharged hydrogen concentration is detected by use of a mass spectroscope or a thermal conductivity detector of a gas chromatography to calculate an amount of hydrogen consumed according to a reaction temperature. A temperature at which the hydrogen reduction starts and a temperature at which the hydrogen reduction is maximally accomplished are obtained from the amount of hydrogen consumed. According to the present invention, the hydrogen reduction starts at about 408° C. or lower and is maximally accomplished at about 506° C. or lower.

Furthermore, in the $O_2$-TPO test of the catalyst, the catalyst is heated at a heating rate of 10° C./min to 400° C. while 0.5 volume % ammonia is fed into a reactor in which 0.3 g catalyst is charged at a rate of 50 cc/min, and left at 400° C. for 30 min to be reduced. The reduced catalyst is then cooled to room temperature, heated at a heating rate of 10° C./min to 600° C. while 1 volume % oxygen is fed into the reactor in which the catalyst is charged. A consumed oxygen concentration is monitored with the mass spectroscope. A temperature at which the oxidation is maximally accomplished is obtained from the oxygen concentration according to the reaction temperature. In the case of the present catalyst, oxygen is maximally consumed at about 405° C. or lower.

As for the oxygen-reoxidation test, the catalyst is heated at a heating rate of 10° C./min to 400° C. while 5000 ppm ammonia flows through the catalyst and left at 400° C. for 30 min to be reduced. The SCR reaction is conducted at 180° C. while 800 ppm nitrogen oxides and ammonia flow through the vanadium/titania-based catalyst in a $NH_3/NO_x$ molar ratio of 1 without oxygen. After a predetermined time, 200 ppm of oxygen additionally flows through the vanadium/titania-based catalyst in conjunction with the nitrogen oxides and ammonia, and then a concentration of nitrogen monoxide is monitored. A conversion of nitrogen oxide according to time is obtained from the concentration of nitrogen monoxide, and the re-oxidation ability of the catalyst is evaluated by the degree of an increase of the conversion. According to the present invention, the conversion of nitrogen monoxide is increased by a maximum of 9% or more and by 8% or more after 60 min.

Accordingly, the catalyst prepared using the preparation method of the present invention can be used to selectively remove nitrogen oxide, and is useful to remove nitrogen oxides in a flue gas containing sulfur oxides.

A process of removing nitrogen oxides is usually conducted at about 150-450° C., preferably 180-350° C., and at a space velocity of about 1000-60000 $hr^{-1}$, preferably 3000-30000 $hr^{-1}$ in the presence of the present catalyst. These reaction conditions indicate that the activity of the present catalyst is improved in comparison with an activity temperature region of a conventional $V_2O_5/TiO_2$-based catalyst.

In this regard, it is preferred to feed ammonia as a reducing agent in such a way that a molar ratio of $NH_3/NO_x$ is about 0.6-1.2. For example, when the molar ratio is excessively low, the removing efficiency of nitrogen oxide is reduced owing to lack of the reducing agent. On the other hand, when the molar ratio is excessively high, unreacted ammonia is undesirably discharged to the atmosphere. Particularly, in the case of treating a flue gas containing sulfur oxides such as sulfur dioxide, the presence of unreacted ammonia should be suppressed to effectively prevent the catalyst from being poisoned by ammonium bisulfate. In consideration of this, it is preferred to treat a flue gas containing sulfur dioxide of about 500 ppm or less.

In conducting the SCR process, sulfur dioxide contained in the flue gas is oxidized into sulfur trioxide on a surface of the catalyst, and sulfur trioxide reacts with moisture and ammonia to produce ammonium bisulfate. Ammonium bisulfate thus produced deposits on the surface of the catalyst, thereby deactivating the catalyst. To prevent the catalyst from being deactivated, the oxidation of sulfur dioxide should be suppressed, the presence of unreacted ammonia must be suppressed, or ammonium bisulfate should be decomposed at relatively low temperatures. The catalyst may be tested using a mixture gas of 150 ppm nitrogen oxides, 15 volume % oxygen, 8 volume % moisture, and 150 ppm sulfur dioxide for 80 days under conditions of a space velocity of 60,000 $hr^{-1}$ and a $NH_3/NO_x$ molar ratio of 0.9 in terms of the deactivation of the catalyst.

Meanwhile, the present vanadium/titania-based catalyst may be formed in such a way that various types of a structure (e.g., a metal plate, a metal fiber, a ceramic filter or honeycomb) are coated therewith. The catalyst may also be coated on a tube, a duct and/or wall in equipments such as an air pre-heater and a boiler. Furthermore, the catalyst may be extruded into a particle-type or monolith-type structure by use of a small amount of binder. For the coating or the extrusion, the catalyst is uniformly crashed into particles, the diameter of which should be adjusted taking into consideration an economic aspect or a uniformity and adhesiveness of a coated or extruded structure. A diameter of about 1-10 μm is suitable. Such a coating and extrusion is well known in the art.

A better understanding of the present invention may be obtained by reading the following examples which are set forth to illustrate, but are not to be construed to limit the present invention.

Preparation Examples 1 to 10, and Comparative Preparation Examples 1 to 5

1) Measurement of a Molar Ratio (O/Ti) of Oxygen Combined with Titanium to Titanium Samples according to Preparation Examples 1-10 and Comparative Preparation Examples 1-5 were prepared using titania as a support as shown in the following Table 1. Titania was analyzed using an XPS (X-ray photoelectron spectroscopy) to measure a molar ratio (O/Ti) of oxygen combined with titanium to titanium.

Ti 2p of titania according to Preparation Example 1 described in the following Table 1 is illustrated in FIG. 6. As shown in FIG. 6, in case of titania onto which vanadium is not impregnated, only titanium with a valence of 4+ exists. This observation was found in other titanias according to Preparation Examples 2-10 and Comparative Preparation Examples 1-5.

Additionally, O 1s of titania according to Preparation Example 1 was analyzed in conjunction with Ti 2p of titania. Oxygen in titania existed in a form of oxygen combined with titanium (O—Ti), oxygen contained in water or hydroxyl groups (—OH) physically adsorbed in the catalyst, and oxygen combined with carbon (C—O). Their binding energies were 529.9 eV, 530.2 eV and 531.6 eV, respectively.

Furthermore, O 1s values of titanias according to Preparation Examples 2-10 and Comparative Preparation Examples 1-5 were analyzed. From the calculation of the O/Ti molar ratio, it can be seen that titania may exist in a non-stoichiometric form (i.e., O/Ti ratio beyond 2 or below 2) as well as stoichiometric $TiO_2$. To investigate how the O/Ti ratio affects a removal efficiency of nitrogen oxides, in FIG. 8, there is illustrated a graph showing a conversion of nitrogen oxides as a function of the O/Ti molar ratio at 200-300° C. At a relatively low temperature of 200° C., the conversion of nitrogen oxides is relatively high when the O/Ti molar ratio is from 1.47 to 2.0. Accordingly, it was confirmed that titania having the specific range of O/Ti molar ratio is useful as a support.

TABLE 1

|  | Specific surface area of titania (m²/g) | Macropore volume of titania (cm³/g) | O/Ti ratio of titania |
| --- | --- | --- | --- |
| Preparation Example 1 | 72.9 | 0.3386 | 1.92 |
| Preparation Example 2 | 54.1 | 0.3157 | 1.88 |
| Preparation Example 3 | 54.1 |  | 1.91 |
| Preparation Example 4 | 51.1 | 0.2350 | 1.91 |
| Preparation Example 5 | 93.6 | 0.3785 | 1.86 |
| Preparation Example 6 | 63.2 |  | 1.57 |
| Preparation Example 7 | 91.9 | 0.3509 | 1.47 |
| Preparation Example 8 | 83.4 | 0.3081 | 1.54 |
| Preparation Example 9 | 95.4 |  | 1.74 |
| Preparation Example 10 | 97.4 |  | 1.77 |
| Comparative Preparation Example 1 | 65.9 | 0.1280 | 1.45 |
| Comparative Preparation Example 2 | 192.9 | 0.6340 | 1.42 |
| Comparative Preparation Example 3 | 134.3 | 0.3200 | 1.32 |
| Comparative Preparation Example 4 | 13 | 0.0250 | 2.16 |
| Comparative Preparation Example 5 | 4.4 | 0.0060 | 2.14 |

2) Evaluation of the Reducing Power of Titania

In order to evaluate the reducing power of a titania support used to produce a vanadium/titania-based catalyst, the $H_2$-TPR test was carried out for each of titania supports according to Preparation Examples 1, 5, and 7, and Comparative Preparation Examples 1, 3, and 4. At this time, details of the $H_2$-TPR test are given in the following documents:

i) D. A. Bulushev et al., Journal of Catalysis 205 (2002) 115-122
ii) M. A. Reiche et al., Catalysis Today 56 (2000) 347-355
iii) F. Arena et al., Applied Catalysis A: General 176 (1999) 189-199.

50 mg titania sample was heated at a heating rate of 10° C./min from room temperature to 900° C. while 5 volume % hydrogen flows through the titania sample at a rate of 30 cc/min. In doing so, a hydrogen concentration was monitored continuously by use of a thermal conductivity detector of a gas chromatograph. An amount (μmol/g) of hydrogen consumed during the reduction of titania by hydrogen was measured from the hydrogen concentration. In this regard, amounts of hydrogen consumed were 2012, 2130, 1384, 682, 684, 706, and 1050 μmol/g in the case of Preparation Examples 1, 5, and 7, and Comparative Preparation Examples 1, 3, 4, and 5, respectively. At this time, the titania sample was pre-treated at 250° C. for 30 min under a nitrogen atmosphere to remove moisture therefrom prior to heating.

The amount of the consumed hydrogen in titania (experimental values) is an amount of hydrogen consumed using the experimental methods. The denitrification efficiencies of the catalysts prepared using the above titania at low temperatures of 200° C. and 220° C. were compared with each other, and the results thereof are shown in FIG. 7.

Examples 1 to 10, and Comparative Examples 1 to 5

0.91 g ammonium metavanadate ($NH_4VO_3$: 20555-9 manufactured by Aldrich Chemical. Co.) was dissolved in 30 mL distilled water. 1.4 g oxalic acid was added to water containing ammonium metavanadate to increase the solubility of ammonium metavanadate in water and control a valence of vanadium. Each of titania supports according to Preparation Examples 1-10, and Comparative Preparation Examples 1-5 was added to the resulting solution in an amount of 20 g to give a slurry. The slurry was heated at 70° C. using a vacuum evaporator while it is agitated, and then dried at 100° C. for 24 hours. Thereafter, a calcination was performed at 400° C. for 6 hours under an oxygen atmosphere (79 vol % of inert gas) to produce a catalyst. The catalyst was analyzed using an elementary analysis device (Optima 3000XL manufactured by Perkin Elmer Co.), and it is confirmed that the catalyst includes 2.0 wt % vanadium based on a weight of titania. Further, a specific surface area ($m^2/g$) of the catalyst was measured by a BET (Brunauer-Emmett-Teller) equation using ASAP 2010C manufactured by Micrometritics Co., the catalyst was analyzed using an XRD (X-ray diffractomer, MX18X HF-SRA manufactured by MAC Science Co.) to obtain a full-width at half maximum (B) of the catalyst, an angle of diffraction ($\theta$) was substituted into a Scherrer's equation to calculate a mean particle size (mm) of the catalyst, and main characteristic peaks of anatase and rutile, that is, $2\theta=25°$ and 27.5° were substituted into an equation $W_A=1/(1+1.265 (I_R/I_A))$ (wherein, $W_A$ is a ratio of anatase, $I_R$ is an area of a characteristic peak of rutile at a plane of (110), and $I_A$ is an area of a characteristic peak of anatase at a plane of (101)) to calculate a ratio of anatase and rutile, and the results are described in Table 2.

Meanwhile, various vanadium/$TiO_2$— based catalysts as prepared above were analyzed according to the following Experimental Examples.

Experimental Example 1

Analysis of Conversion of Nitrogen Oxides According to a Temperature for Each Catalyst Conversions of nitrogen oxides according to a temperature for the catalysts described in the Table 2 were calculated and illustrated in FIG. 1. In this regard, a temperature of a reactor varies within a range of 150-400° C., a concentration of nitrogen oxides was 800 ppm, and a molar ratio of $NH_3/NO_x$ was controlled to 1.0. Furthermore, concentrations of oxygen and moisture were respectively 3 and 6 volume %, and a space velocity was 60,000 $hr^{-1}$. The catalysts were maintained at 400° C. for 1 hour under the atmosphere to prevent moisture adsorbed in the catalysts before nitrogen oxides were converted and valences of vanadium and titanium from affecting the SCR, and then cooled to a reaction temperature.

With reference to FIG. 1, in the case of most of the catalysts except for catalysts of Comparative Examples 4 and 5, conversions of nitrogen oxides were high at a relatively high temperature of 400° C. However, only catalysts according to Examples 1-10 have better catalytic activity to convert nitrogen oxides at a relatively low temperature of 250° C. or lower.

Particularly, catalytic activity differences between the catalysts are more obviously shown at low temperatures of 150-250° C. In other words, the catalysts according to Examples 1-10 have the relatively excellent degree of catalytic activities, compared with catalysts according to Comparative Examples 1-5.

The above observations indicates that even though the vanadium/titania-based catalysts having the same vanadium amount may be prepared according to the same manner, the conversion of nitrogen oxides, in essential, varies with physical properties of the catalysts.

Examples 11 to 12, and Comparative Example 6

Figure 2:
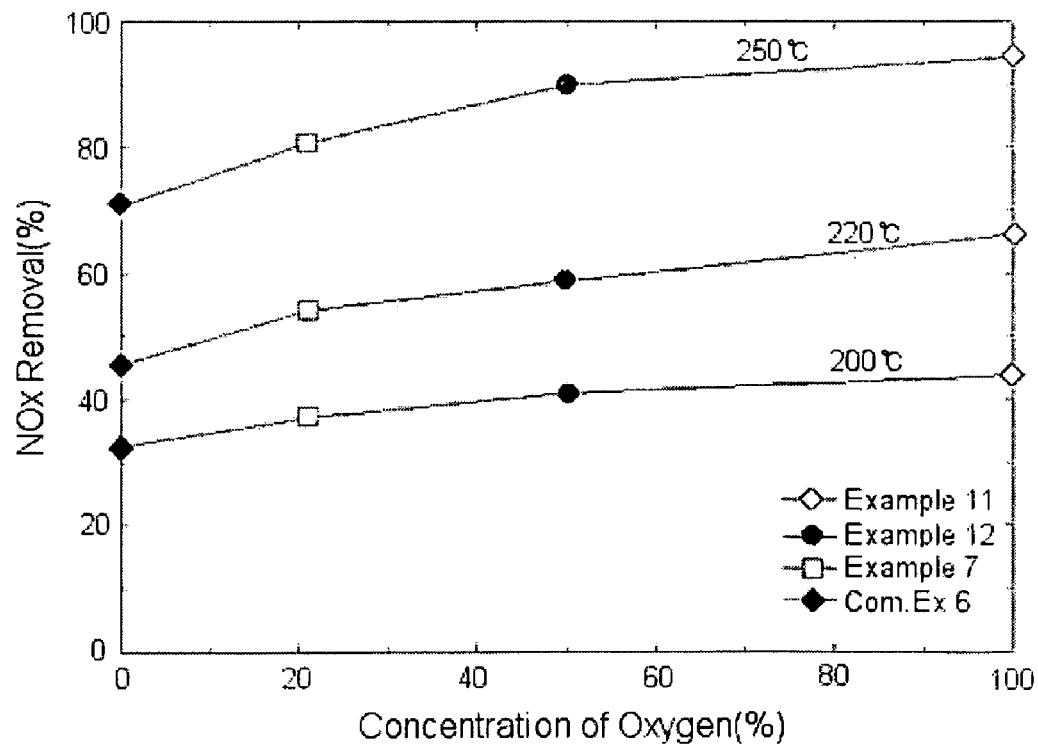
FIG. 2 is a graph showing a conversion of nitrogen oxides as a function of a reaction temperature for catalysts according to Preparation Examples 11 to 12 and Comparative Preparation Example 6 in the same manner as in Experimental Example 1.

0.91 g ammonium metavanadate ($NH_4VO_3$: 20555-9 manufactured by Aldrich Chemical Co.) was dissolved in 30 mL distilled water. 1.4 g oxalic acid was added to water containing ammonium metavanadate to increase the solubility of ammonium metavanadate in water and control a valence of vanadium. A titania support according to Preparation Example 7 was added to the resulting solution in an amount of 20 g to give a slurry. The slurry was heated at 70° C. using a vacuum evaporator while it is agitated, and then dried at 100° C. for 24 hours. Thereafter, each calcination was performed at 400° C. for 6 hours under an 100% oxygen atmosphere, an 50% oxygen atmosphere and a nitrogen atmosphere to produce catalysts of Example 11 to 12 and Comparative Example 6. Denitrification tests were conducted using these produced catalysts in the same manner as in Experimental Example 1, and were compared with Example 7, and the results thereof are shown in FIG. 2.

Experimental Example 2

Analysis for a Species of Titanium and Vanadium Oxides Formed on a Surface of the Catalyst and a Distribution of Titanium and Vanadium Oxides An XPS was used to analyze species of titanium oxides and vanadium oxides formed on a surface of the catalyst, and a distribution of respective titanium oxides and vanadium oxides.

Figure 3A:
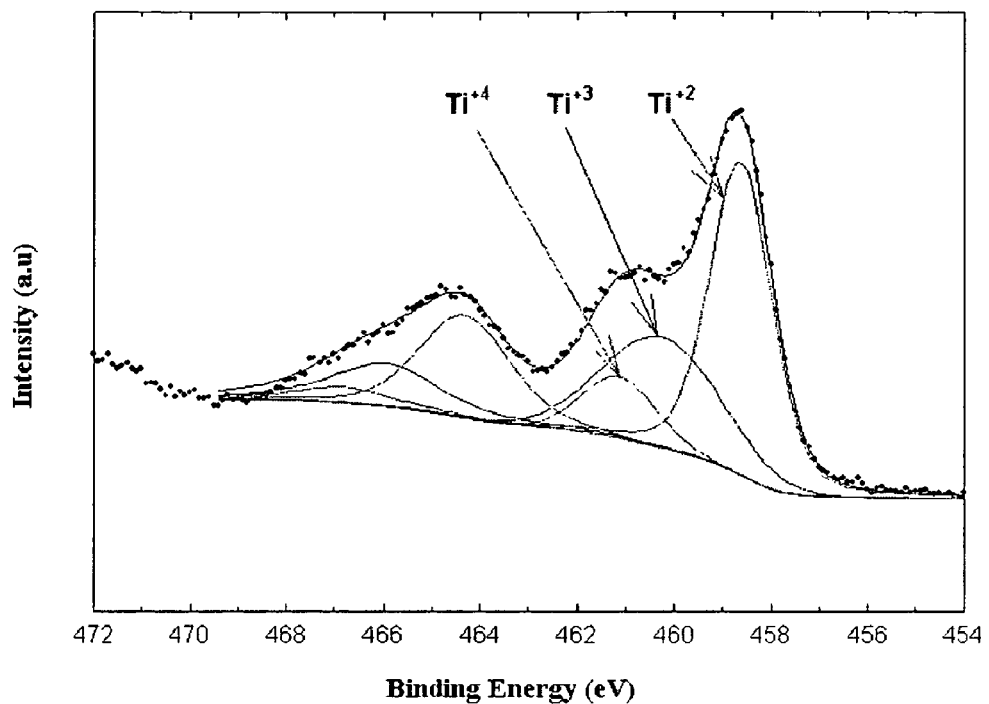
FIGS. 3A and 3B are graphs showing XPS analysis results of Ti 2p and V 2p of a catalyst according to Example 5 of the present invention, respectively.
Figure 3B:
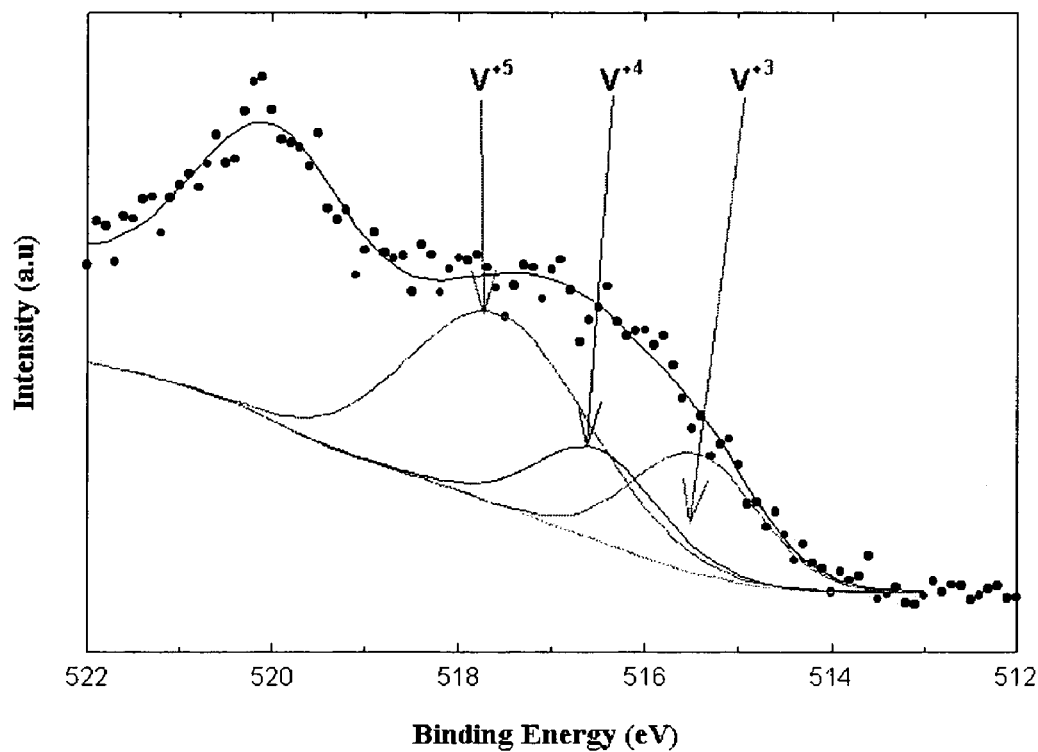

For example, the catalyst according to Example 5 was analyzed using the XPS in terms of Ti 2p and V 2p, and the results are illustrated in FIGS. 3A and 3B. Referring to FIG. 3A, titanium of titania on which vanadium is supported has various valences. That is to say, non-stoichiometric titanium oxides including $Ti^{3+}$ and/or $Ti^{2+}$, which are reduced from $TiO_2$ exist.

From FIG. 3B, it can be seen that non-stoichiometric vanadium oxides including $V^{4+}$ and/or $V^{3+}$ exist on a surface of the catalyst.

The generalized values for the non-stoichiometric vanadium atoms ($V^{4+}$ and $V^{3+}$) and the non-stoichiometric titanium atoms ($Ti^{3+}$ and $Ti^{2+}$), respectively, are described in Table 2.

In accordance with the conventional arts, it is known that the vanadium oxides in a vanadium/titania-based catalyst exist in a form of $V_2O_5$ (i.e., $V^{5+}$), and titania exists in a form of stable, stoichiometric $TiO_2$. On the contrary, it was observed that non-stoichiometric vanadium atoms exist in the catalysts falling within the scope of the present invention as shown in the Table 2 and FIGS. 3A and 3B.

Figure 4B:
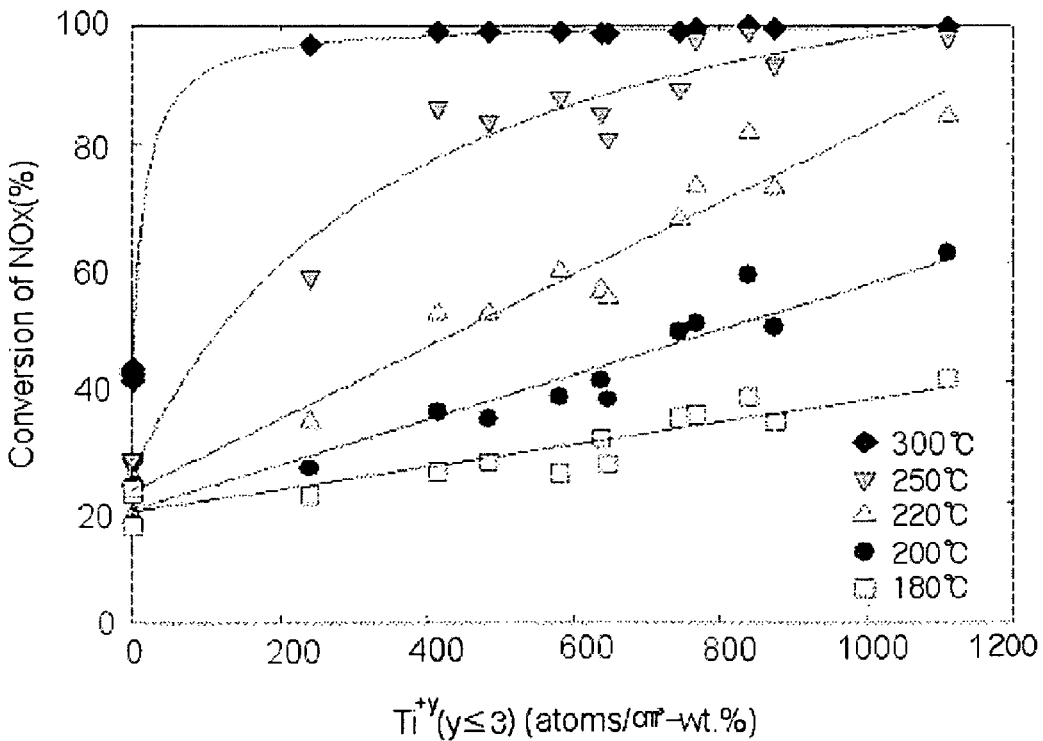
FIG. 4B is a graph showing a conversion of nitrogen oxides at a temperature of 180~300° C. as a function of a generalized value which is obtained by dividing the number of 3+ and 2+ valences of titanium atoms per unit volume by wt % of the supported vanadium for catalysts according to Examples 1 to 10 of the present invention and Comparative Examples 1 to 3 of the present invention.

Turning now to FIGS. 4A and 4B, there is illustrated graphs showing conversions of nitrogen oxides as a function of the generalized value which is expressed in a unit of atoms/$cm^3$·wt % for non-stoichiometric vanadium atoms of $V^{4+}$ and $V^{3+}$, and non-stoichiometric titanium atoms of $Ti^{3+}$ and $Ti^{2+}$, respectively, in the catalysts according to Examples 1-10 and Comparative Examples 1-3. As shown in FIG. 4A, the conversion of nitrogen oxides is intimately associated with the number of non-stoichiometric vanadium atoms. At this time, the more the number of non-stoichiometric vanadium atoms is, the higher the conversion of nitrogen oxides becomes. Hence, it is confirmed that the catalyst with the high activity at relatively low temperatures should have the high number of non-stoichiometric vanadium atoms. On the other hand, the conversion of nitrogen oxides is little associated with the number of non-stoichiometric vanadium atoms at high temperatures (i.e., 300° C.). In view of the above, it is concluded that the number of non-stoichiometric vanadium atoms has a great influence on a denitrification at relatively low temperatures. Along the same line, the number of non-stoichiometric titanium atoms is little related to the conversion of nitrogen oxides at high temperatures (i.e., 300° C.), but is intimately associated with the conversion of nitrogen oxides at relatively low temperatures of 200 and 220° C., as shown in FIG. 4B. The reason therefor is believed that when impregnated onto the titania support and then calcined, the vanadium precursor receives oxygen from the titania while titania is reduced. Therefore, it can be seen that the numbers of non-stoichiometric vanadium and titanium atoms are closely related to each other, and affect the conversion of nitrogen oxides at relatively low temperatures.

To sum up, it is recognized that in order to show the excellent SCR performance at the relative low temperatures, the generalized value for the non-stoichiometric vanadium atoms of $V^{4+}$ and $V^{3+}$ should be about 34 atoms/cm$^3$·wt % or more and the generalized value for the non-stoichiometric titanium atoms of $Ti^{3+}$ and $Ti^{2+}$ should be about 415 atoms/cm$^3$·wt % or more.

affects a procedure in which vanadium is supported on the titania to contribute to forming non-stoichiometric titanium and vanadium.

For example, in the case of the catalyst according to Comparative Examples 1-3, the reduction of the titania support is not desirably accomplished, thus it is difficult to form $V^{4+}$ and $V^{3+}$. In addition, because the O/Ti ratio is within the range between 1.3 and 1.4, it can be seen that the amount of lattice oxygen is insufficient. As for the catalyst according to Comparative Examples 4 and 5, the catalyst has the low activity even though the O/Ti ratio is about 2.15, that is, a ratio of oxygen is high. The reason therefor is that titania is not combined with vanadium at the interface therebetween due to a low reduction ability of the titania, and instead combined with gaseous oxygen to form vanadium oxide while vanadium is impregnated onto titania and calcined. The vanadium oxide thus formed is different from that formed by the reduction of the titania and bonded to titania through the oxygen bridge. Thus, the non-stoichiometric vanadium oxides such as $V_2O_3$ and $V_2O_4$ may be formed on the titania support, which is out of the scope of the present invention, however, such non-stoichiometric vanadium oxides correspond to the simple combination of the vanadium oxide precursor (e.g., ammonium metavanadate) with gaseous oxygen supplied during the calcination.

In the light of the above, a predetermined amount or more of non-stoichiometric vanadium oxide should exist in the catalyst and simultaneously a molar ratio of O/Ti in titania

TABLE 2

| Catalyst (V/TiO$_2$) | Specific surface area of titania (m$^2$/g) | Particle size of titania (nm) | Ratio of anatase to rutile in titania | Ti$^{3+}$ and Ti$^{2+}$ (atoms/cm$^3$·wt %) | V$^{4+}$ and V$^{3+}$ (atoms/cm$^3$·wt %) |
|---|---|---|---|---|---|
| Example 1 | 72.9 | 23 | 100:0 | 1112 | 76 |
| Example 2 | 54.1 | 59 | 93.6:6.4 | 840 | 87 |
| Example 3 | 54.1 | 34 | 100:0 | 875 | 46 |
| Example 4 | 51.1 | 33 | 74.2:25.8 | 746 | 67 |
| Example 5 | 93.6 | 22 | 100:0 | 768 | 42 |
| Example 6 | 63.2 | 27 | 100:0 | 638 | 38 |
| Example 7 | 91.9 | 24 | 100:0 | 648 | 44 |
| Example 8 | 83.4 | 29 | 100:0 | 582 | 34 |
| Example 9 | 95.4 | 16 | 100:0 | 415 | 36 |
| Example 10 | 97.4 | 21 | 100:0 | 485 | 40 |
| Com. Ex. 1 | 65.9 | 15 | 0:100 | 241 | 33 |
| Com. Ex. 2 | 192.9 | 15 | 100:0 | 0 | 15 |
| Com. Ex. 3 | 134.3 | 15 | 100:0 | 0 | 33 |
| Com. Ex. 4 | 13 | 54 | 98:2 | 677 | 114 |
| Com. Ex. 5 | 4.4 | 55 | 4:96 | 0 | 168 |

[1]Area: Specific surface area

In view of the results according to Preparation Examples and the Experimental Examples, it can be seen that as the amount of hydrogen consumed for the reduction increases, the SCR activity of the catalyst grows higher. Accordingly, it is preferred that the titania support has a hydrogen reduction ability of about 1384 µmol/g or more to desirably conduct the SCR reaction.

The support of the catalyst with the low activity has a low hydrogen reduction. This means that the reduction ability of the titania support affects the activity of the catalyst, and should be in the range of about 1.47-2.0 to secure desirable removal efficiency of nitrogen oxide in the SCR reaction.

Experimental Example 3

To explain using the change of a Fermi level the fact that a catalyst containing non-stoichiometric vanadium and titanium has high activity in the present invention, a computer simulation was conducted to confirm the change of a semiconductor energy level of titania oxide in the catalyst. At this time, titania had a completely oxidized anatase-typed crystal structure and existed in a form of TiO$_2$. In order to understand the influence of titania on the reduction, oxygen was removed from titania to accomplish the reduction of titania. Because a non-stoichiometric ratio of titania is $TiO_y$, completely oxidized $TiO_2$ is realized by monitoring an electrochemical phenomenon of $Ti_4O_8$ which is the same as $TiO_2$ in terms of stoichiometry, and an electrochemical change of $Ti_4O_7$ which is obtained by removing one oxygen atom from $Ti_4O_8$ is monitored to realize reduced titania. Even though the actual reduced titania on which vanadium is supported is different from a sample simulated by a computer, the computer simulation conducted in this Experimental Example is useful in confirming a trend of electrochemical properties of reduced titania.

FIG. 5A is a graph showing a density of state (DOS) as a function of an energy level for stoichiometric anatase-typed titania (titania is expressed by $Ti_4O_8$ instead of $TiO_2$ to simulate it by the computer in Experimental Example 3). At this time, the DOS and energy level are obtained from the computer simulation. In FIG. 4A, the term 'EF' positioned on an X-axis denotes a Fermi level. The EF is positioned at the center of the X-axis, signals are positioned at both sides of the EF, and a valley is formed between a left and a right signal. The left signal is a signal for VB, and the right signal is a signal for VB. An energy located at a right end of the VB signal corresponds to an edge of the VB, and an energy located at a left end of the CB signal corresponds to an edge of the CB. In this regard, a space between the edges of the VB and CB corresponds to a band-gap energy. The Fermi level of titania is positioned between the edges of the VB and CB, and particularly, positioned near the VB signal.

FIG. 5B illustrates a result of the computer simulation of a $Ti_4O_7$ compound which is reduced by removing one oxygen atom from $Ti_4O_8$. This intends to simulate by the computer how lattice oxygen of titania is covalent-bonded to vanadium when a vanadium compound is formed on a titania support. In FIG. 4B, the Fermi level has a higher level than the CB, and the DOS is rapidly increased at the Fermi level. Hence, electrons are readily transferred with the same degree as metals between the Fermi level and CB. This means that reduced titanium oxide $Ti_4O_7$ has a lower energy level than completely oxidized $Ti_4O_8$, thus electrons at the Fermi level are transferred to the CB. In the SCR reaction, the reduced non-stoichiometric titania can act as a support having higher activity than completely oxidized stoichiometric titania at relatively low temperatures. Non-stoichiometric titania on which vanadium is supported causes the change of the band-gap energy and Fermi level, thereby readily transferring electrons.

Experimental Example 4

In this Experimental Example, $H_2$-TPR test was carried out for each of the catalysts according to Examples 1, 4, 5, and 7, and Comparative Examples 1, 3, 4, and 5.

According to the $H_2$-TPR test, 50 mg catalyst was heated from room temperature to 900° C. while 5 volume % hydrogen flowed through the catalyst at a rate of 30 cc/min to continuously monitor a hydrogen concentration using a mass spectroscope. The catalyst was oxidized at 400° C. for 30 min while air flowed through the catalyst to remove moisture therefrom and to be activated and then pre-treated at 300° C. for 90 min under a nitrogen atmosphere to remove oxygen therefrom, prior to conduct the $H_2$-TPR test.

A starting temperature of the hydrogen reduction and a maximum hydrogen reduction temperature as an indirect evaluation factor used to evaluate the reduction ability of the catalyst were measured, and the results are described in Table 3. From the Table 3, it can be seen that maximum hydrogen reduction temperatures of most of the catalysts are about 500° C. and similar to each other. However, the catalyst with lower activity has the higher starting temperature of the hydrogen reduction. In other words, the catalyst with relatively high activity has excellent reduction ability at relatively low temperatures, and easily provides lattice oxygen at relatively low temperatures upon the reduction of nitrogen oxides. Accordingly, when the starting temperature of the hydrogen reduction and maximum hydrogen reduction temperature of the catalyst are 408° C. or lower and 506° C. or lower, respectively, it has relatively high activity at relatively low temperatures.

TABLE 3

| Catalyst | [1]Starting temperature (° C.) | [2]Maximum temperature(° C.) |
|---|---|---|
| Example 1 | 358 | 490 |
| Example 4 | 408 | 505 |
| Example 5 | 404 | 500 |
| Example 7 | 386 | 506 |
| Comparative Example 1 | 363 | 502 |
| Comparative Example 3 | 402 | 494 |
| Comparative Example 4 | 414 | 521 |
| Comparative Example 5 | 433 | 536 |

[1]Starting temperature: Starting temperature of the hydrogen reduction
[2]Maximum temperature: Maximum hydrogen reduction temperature Experimental Example 5

In this Experimental Example, an $O_2$-TPO test was carried out for each of the catalysts according to Examples 1, 2, 5, 7 and 10, and Comparative Examples 1, 3, 4 and 5 to find temperatures needed to re-oxidize themselves.

According to the $O_2$-TPO test, the catalyst was heated at a heating rate of 10° C./min to 400° C. while 0.5 volume % ammonia was fed into a reactor in which 0.3 g catalyst was charged at a rate of 50 cc/min, and left at 400° C. for 30 min to be reduced. The reduced catalyst was then cooled to room temperature, heated at a heating rate of 10° C./min to 600° C. while 1 volume % oxygen was fed into the reactor in which the catalyst was charged to monitor a consumed oxygen concentration using a mass spectroscope. The results are described in Table 4. From the Table 4, it can be seen that the catalyst with higher activity has the lower maximum oxygen consumption temperature. Accordingly, when the maximum oxygen consumption temperature of the catalyst is about 405° C. or lower, it has relatively high activity at relatively low temperatures.

TABLE 4

| Catalyst | Maximum oxygen consumption temperature(° C.) |
|---|---|
| Example 1 | 355 |
| Example 2 | 343 |
| Example 5 | 377 |
| Example 7 | 362 |
| Example 10 | 405 |
| Comparative Example 1 | 406 |
| Comparative Example 3 | 439 |
| Comparative Example 4 | 417 |
| Comparative Example 5 | 476 |

Experimental Example 6

In this Experimental Example, an oxygen-reoxidation test was carried out for each of the catalysts according to Examples 1, 4, 5, 7, 9 and 10, and Comparative Examples 1, 3, 4 and 5 to measure the extent of the reoxidation thereof.

According to the oxygen-reoxidation test, the catalysts were heated at a heating rate of 10° C./min to 400° C. while 5000 ppm ammonia flowed through the catalysts and left at 400° C. for 30 min to be reduced, and a SCR reaction was conducted at 180° C. while 800 ppm nitrogen oxides and ammonia flow through the vanadium/titania-based catalyst in a $NH_3/NO_x$ molar ratio of 1 without oxygen, and after a predetermined time, 200 ppm oxygen additionally flows through the vanadium/titania-based catalyst in conjunction with the nitrogen oxides and ammonia to monitor a concentration of nitrogen monoxide discharged.

Figure 9:
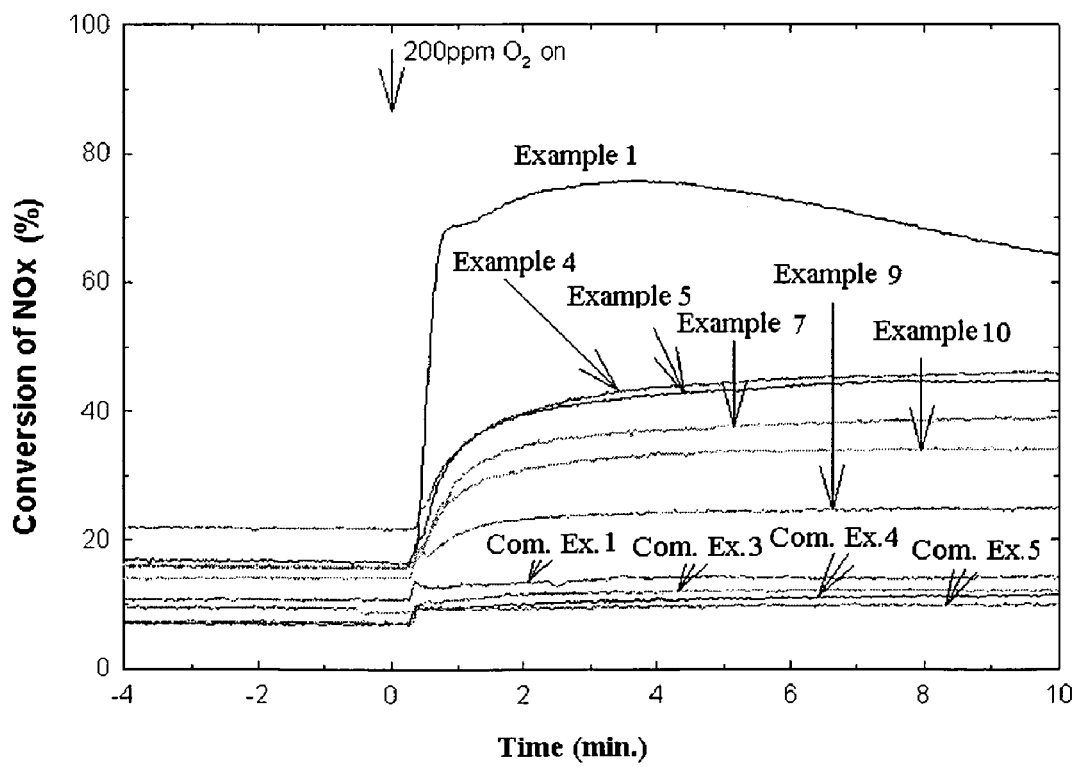
FIG. 9 is a graph showing a conversion of nitrogen oxides as a function of a reaction time for catalysts according to Examples 1, 4, 5, 7, 9, and 10 and Comparative Examples 1, 3, 4, and 5 to secure re-oxidation characteristics of the catalysts, after the catalysts are reduced using ammonia at 400° C. for 30 min and oxygen is then additionally fed in conjunction with nitrogen oxides and ammonia into a reactor at 180° C.

At this time, only nitrogen monoxide was discharged from the SCR reaction because nitrogen dioxide was not detected. A conversion of nitrogen oxide was calculated based thereon, and the results are illustrated in FIG. 9. In FIG. 9, oxygen starts to be supplied to the catalyst at 0 min.

Referring to FIG. 9, in the case of using the catalysts according to Examples 1, 4, 5, 7, 9 and 10, a conversion of nitrogen monoxide is rapidly increased after oxygen is supplied to the catalysts. On the other hand, in the case of using the catalysts according to Comparative Examples 1, 3, 4 and 5, the conversion of nitrogen monoxide is slightly increased. In particular, even though the catalyst of Comparative Example 1 has higher activity than the catalysts of Comparative Examples 3 to 5, the catalysts according to Comparative Examples 1, 3 to 5 are similar to each other in terms of a change of the conversion of nitrogen monoxide. The reason therefor is that a concentration of oxygen supplied to the catalyst is very low. From the above observation, it can be understood that the catalyst from which lattice oxygen is removed during the reduction recovers activity by the reoxidation. In particular, the catalyst with higher activity is more actively reoxidized.

Therefore, in consideration of the $H_2$-TPR test of Experimental Example 4 as well as the oxygen-reoxidation, the catalyst which is easily reduced and reoxidized effectively removes nitrogen oxide at relatively low temperatures in the SCR reaction.

From FIG. 9, it can be seen that the catalyst containing titania with high reduction ability as a support is advantageous in reoxidizing the catalyst by gaseous oxygen. Furthermore, under the same conditions as Experimental Example 6, the catalyst which increases the conversion of nitrogen monoxide by a maximum of 9% or more and by 8% or more after 60 min has high activity at relatively low temperatures.

Experimental Example 7

Figure 10:
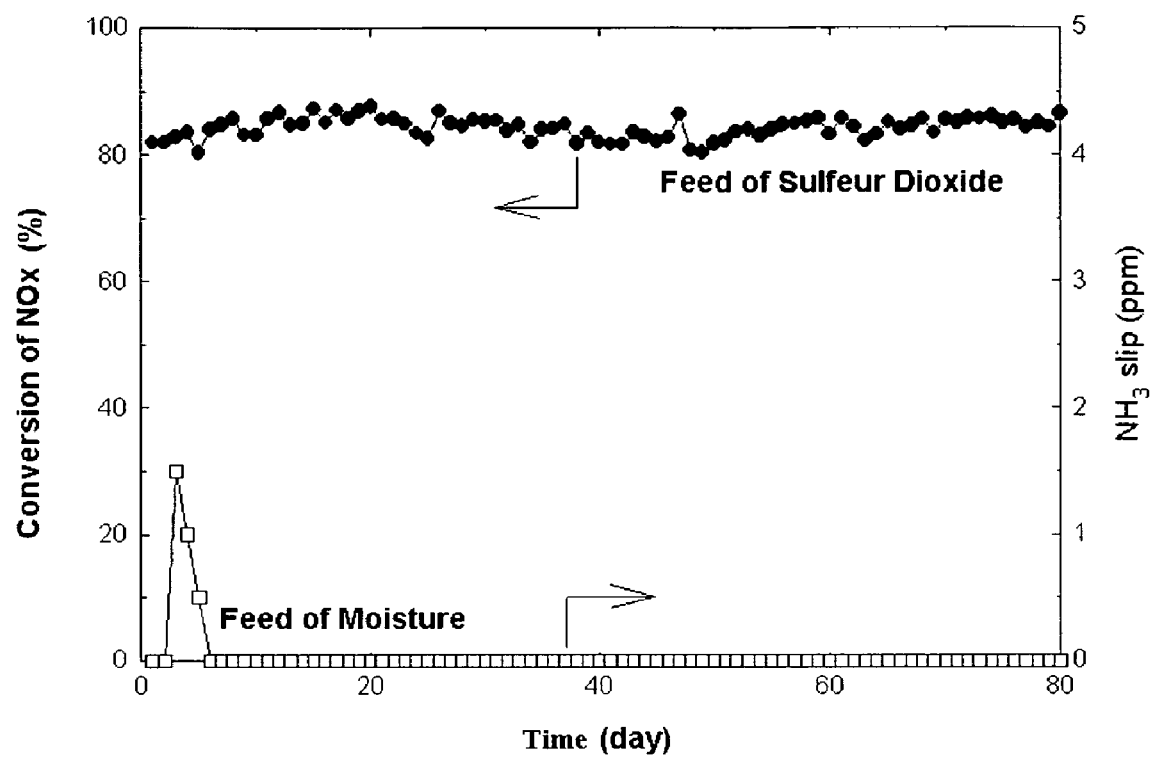
FIG. 10 is a graph showing a conversion of nitrogen oxides and an amount of unreacted ammonia as a function of a reaction period for a catalyst according to Example 1 of the present invention, in case that a flue gas containing sulfur dioxide and moisture is fed into a reactor containing the catalyst at 200° C.

The catalyst according to Example 1 was tested at 200° C. using a mixture gas of 8 volume % moisture and 150 ppm sulfur dioxide to calculate a conversion of nitrogen oxide and an discharged amount of unreacted ammonia according to a reaction time, and the results are illustrated in FIG. 10. At this time, a concentration of nitrogen oxide was 150 ppm and a $NH_3/NO_x$ molar ratio was 0.9. Further, a concentration of oxygen was 15 volume %, and a space velocity was 60,000 $hr^{-1}$. The catalyst was left at 400° C. for one hour under the atmosphere to prevent moisture adsorbed in the catalysts before nitrogen oxide was converted and valences of vanadium and titanium from affecting the SCR reaction, and then cooled to a reaction temperature.

In this regard, the catalyst was not deactivated by moisture as shown in FIG. 10. Further, initially, a small amount of unreacted ammonia was discharged, but after a predetermined time, the discharge of unreacted ammonia was not detected. Accordingly, because ammonia selectively reacted with nitrogen oxide even though sulfur dioxide was contained in a discharged gas, ammonium bisulfate causing the deactivation of the catalyst was not formed, and ammonium sulfate produced by reacting sulfur trioxide, moisture and ammonia and acting as a poison of the catalyst was not generated, thereby activity of the catalyst was not reduced.

INDUSTRIAL APPLICABILITY

As apparent from the above description, the present invention provides a vanadium/titania-based catalyst having high activity at a low temperature of 300° C. or lower as well as at a high temperature of 300~400° C., in which $V^{4+}$ and/or $V^{3+}$ as well as $V^{5+}$ are formed and $Ti^{3+}$ and/or $Ti^{2+}$ as well as $Ti^{4+}$ are formed. At this time, the presence of non-stoichiometric vanadium atoms contributes to allowing the catalyst to receive electrons and to allowing the electrons to be actively transferred to promote the reduction by lattice oxygen and the oxidation by gaseous oxygen. That is to say, the catalyst readily receives gaseous oxygen to produce activated lattice oxygen, and thus the activated lattice oxygen participates in the reduction of the catalyst to decompose nitrogen oxide. At this time, the reduced catalyst receives gaseous oxygen to be re-oxidized. Hence, the catalyst according to the present invention has excellent oxidation and/or reduction ability and high activity in the SCR of removing nitrogen oxide.

Further, the present invention is advantageous in that the removing efficiency of nitrogen oxide is improved because nitrogen oxide is removed at a low temperature of 300° C. or lower, the formation of salts such as ammonium bisulfate and/or ammonium nitrate is suppressed because an amount of unreacted ammonia is reduced, and a life span of the catalyst is increased and the corrosion of devices is reduced because the salts are decomposed at relatively low temperatures.

Furthermore, the present invention is advantageous in that a flue gas reheating apparatus is not required and auxiliary fuel expenses are reduced because catalysts can be operated at a low temperature of 300° C. or lower. For example, when a conventional denitrification catalyst (hereinafter, referred to as "a catalyst A") applied at 305° C. and a denitrification catalyst (hereinafter, referred to as "a catalyst B") of the present invention applied at 280° C. are used in a boiler for producing steam at a production rate of 150 ton/hr, the economical profits thereof are calculated as follows. Here, when the boiler has a yearly average load factor of 57.9%, a yearly average steam production rate of 89.7 ton/hr and a yearly average operation time of 345 days, and the average temperature of flue gas flowing into a denitrification equipment is 274° C., the energy necessary for the flue gas reheating apparatus is 7,349,243 Mcal/year in the case of the catalyst A, and 3,482,322 Mcal/year in the case of the catalyst B. When LNG is used as auxiliary fuel, the amount of required LNG is 699,928 m³/year in the case of the catalyst A, and 331,650 m³/year in the case of the catalyst B. Therefore, the present invention is advantageous in that the consumption of energy can be reduced.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A method of preparing a vanadium/titania-based catalyst for removing nitrogen oxides, comprising:
   (a) dissolving a vanadium precursor in an aqueous solution;
   (b) introducing titania into the aqueous vanadium precursor solution to form a slurry, in which the titania has a molar ratio of oxygen to titanium (O/Ti) of 1.47~2.0 by XPS analysis and an amount of hydrogen consumed per unit weight of the titania as measured by a $H_2$-TPR test is in the range of 1384 µmol/g or more;
   (c) removing moisture from the slurry and then drying the slurry; and
   (d) calcining the resulting slurry obtained in step (c) under an oxygen atmosphere to provide lattice oxygen,
   wherein the $H_2$-TPR test is conducted under such a condition that 50 mg of the titania is heated at a heating rate of 10° C./min from room temperature to 900° C. while 5 volume % hydrogen flows through the titania at a rate of 30 cc/min and the catalyst has a generalized value for $V^{4+}$ and $V^{3+}$ of 34 atoms/cm$^3$ wt % or greater, and a generalized value for $Ti^{3+}$ and $Ti^{2+}$ of 415 atoms/cm$^3$ wt % or greater by XPS analysis, wherein the generalized value is defined as a number of non-stoichiometric atoms per unit volume (cm$^3$) of the catalyst divided by wt % of the supported vanadium.

2. The method as set forth in claim 1, wherein, in step (a), the vanadium precursor is ammonium metavanadate or vanadium oxytrichloride.

3. The method as set forth in claim 1, wherein, in step (c), the slurry is heated to 50~70° C. and simultaneously agitated to remove moisture therefrom, and the drying of the slurry is conducted at a temperature of about 100° C. for 5~30 hours.

4. The method as set forth in claim 1, wherein, in step (d), the calcining of the resulting slurry is conducted at a temperature of 350~450° C. for 1~10 hours.

5. The method as set forth in claim 1, wherein an amount of inert gas present in the oxygen atmosphere is below 79%.

6. The method as set forth in claim 1, wherein an amount of inert gas present in the oxygen atmosphere is below 50%.

7. The method as set forth in claim 1, wherein an amount of the vanadium supported on the titania is 1-10 wt % based on the catalyst.

* * * * *